US012759794B2

(12) United States Patent
Walti et al.

(10) Patent No.: US 12,759,794 B2
(45) Date of Patent: Oct. 13, 2026

(54) SYSTEM AND METHOD FOR NAVIGATING IN 3D FROM ANY CELL TO ANY CELL WITH A SINGLE MATERIAL HANDLING ROBOT

(71) Applicant: Mytra, Inc., South San Francisco, CA (US)

(72) Inventors: Christopher Walti, South San Francisco, CA (US); Stefan Ozog, Winnipeg (CA); Gagan Thable, South San Francisco, CA (US); Emre Kalayci, South San Francisco, CA (US); Nathan Power, South San Francisco, CA (US); Daniel Livingston, Hayward, CA (US)

(73) Assignee: Mytra, Inc., Brisbane, CA (US)

( * ) Notice: Subject to any disclaimer, the term of this patent is extended or adjusted under 35 U.S.C. 154(b) by 348 days.

(21) Appl. No.: 18/493,278

(22) Filed: Oct. 24, 2023

(65) Prior Publication Data

US 2024/0140714 A1 May 2, 2024

Related U.S. Application Data

(60) Provisional application No. 63/419,639, filed on Oct. 26, 2022.

(51) Int. Cl.
*B65G 1/137* (2006.01)
*B65G 1/04* (2006.01)

(52) U.S. Cl.
CPC ............. *B65G 1/1373* (2013.01); *B65G 1/04* (2013.01); *B65G 1/0478* (2013.01); *B65G 1/0492* (2013.01)

(58) Field of Classification Search
CPC ...... B65G 1/1373; B65G 1/04; B65G 1/0478; B65G 1/0492
See application file for complete search history.

(56) References Cited

U.S. PATENT DOCUMENTS 3,215,227 A 11/1965 Macchesney
4,287,967 A 9/1981 Perkins
(Continued)

FOREIGN PATENT DOCUMENTS

CN 109099128 A 12/2018
DE 3712087 A1 * 10/1987 ......... G11B 15/6835
(Continued)

OTHER PUBLICATIONS

Walti, et al., "System and/or Method for Dynamic Rebalancing of Multi-Rack Storage", U.S. Appl. No. 18/964,303, filed Nov. 29, 2024.

(Continued)

*Primary Examiner* — Ernesto A Suarez
*Assistant Examiner* — Laurence R Brothers
(74) *Attorney, Agent, or Firm* — Jeffrey Schox; Evan Myers

(57) ABSTRACT

An automated storage and retrieval system includes a multi-level storage rack and a material handling robot, where the multi-level storage rack includes a plurality of cuboid cells and the material handling robot is configured to navigate along a vertical direction or a horizontal direction from a first cuboid cell to a second cuboid cell. When the navigation from the first cuboid cell to the second cuboid cell is along a vertical direction, a set of second engagement structures disposed at corners of the material handling robot are mated with a set of first engagement structures disposed along structural columns of the first cuboid cell. A rotation of the second engagement structures drives the material handling robot to vertically move along the structural columns of the first cuboid cell.

19 Claims, 17 Drawing Sheets

(56) References Cited

U.S. PATENT DOCUMENTS

| | | | | |
|---|---|---|---|---|
| 6,257,426 | B1 | 7/2001 | Masunaka et al. | |
| 7,381,022 | B1 | 6/2008 | King | |
| 8,721,251 | B1 | 5/2014 | Razumov | |
| 9,856,111 | B1 | 1/2018 | Anderson et al. | |
| 10,364,099 | B1 | 7/2019 | Brazeau | |
| 10,399,772 | B1 | 9/2019 | Brazeau | |
| 10,435,241 | B2 | 10/2019 | Lert et al. | |
| 11,554,917 | B2 | 1/2023 | Stevens et al. | |
| 12,338,072 | B1 | 6/2025 | Walti et al. | |
| 12,345,312 | B2 | 7/2025 | Ozog et al. | |
| 2003/0200706 | A1 | 10/2003 | Kahan et al. | |
| 2003/0206789 | A1 | 11/2003 | Tai et al. | |
| 2007/0065258 | A1 | 3/2007 | Benedict et al. | |
| 2008/0277243 | A1 | 11/2008 | Hayduchok et al. | |
| 2010/0058675 | A1 | 3/2010 | Simmons | |
| 2011/0047889 | A1 | 3/2011 | Gad et al. | |
| 2014/0182977 | A1 | 7/2014 | Chen | |
| 2014/0202968 | A1 | 7/2014 | Kirby | |
| 2014/0267703 | A1 | 9/2014 | Taylor et al. | |
| 2014/0290154 | A1 | 10/2014 | Perko et al. | |
| 2015/0127143 | A1* | 5/2015 | Lindbo | G05B 15/02 700/218 |
| 2015/0178673 | A1 | 6/2015 | Penneman | |
| 2015/0197397 | A1 | 7/2015 | Razumov | |
| 2015/0225187 | A1 | 8/2015 | Razumov | |
| 2016/0214835 | A1 | 7/2016 | Jin | |
| 2017/0121110 | A1 | 5/2017 | Zombori | |
| 2018/0148259 | A1* | 5/2018 | Gravelle | B65G 1/0464 |
| 2018/0244467 | A1* | 8/2018 | Hognaland | B65G 1/0478 |
| 2018/0305122 | A1* | 10/2018 | Moulin | B65G 1/0485 |
| 2019/0023492 | A1 | 1/2019 | Voloskov | |
| 2019/0040623 | A1 | 2/2019 | Miller | |
| 2019/0291955 | A1* | 9/2019 | Bastian, II | B65G 1/1373 |
| 2019/0359423 | A1* | 11/2019 | Lee | B65G 1/0407 |
| 2019/0375589 | A1 | 12/2019 | Gravelle et al. | |
| 2019/0389673 | A1 | 12/2019 | Shirouzu et al. | |
| 2020/0048892 | A1 | 2/2020 | Cecchetto et al. | |
| 2021/0131093 | A1 | 5/2021 | Del Rio et al. | |
| 2021/0347569 | A1 | 11/2021 | Dayrell | |
| 2022/0002077 | A1 | 1/2022 | Austrheim et al. | |
| 2022/0071389 | A1 | 3/2022 | Globerman | |
| 2023/0104556 | A1 | 4/2023 | Bowron | |
| 2024/0140714 | A1 | 5/2024 | Walti et al. | |
| 2024/0336436 | A1* | 10/2024 | Lerouge | B65G 1/0485 |
| 2024/0383084 | A1 | 11/2024 | Otani et al. | |
| 2025/0236461 | A1 | 7/2025 | Perry-eaton | |
| 2025/0249603 | A1 | 8/2025 | Herrero et al. | |

FOREIGN PATENT DOCUMENTS

| | | | | |
|---|---|---|---|---|
| WO | 2012123335 A1 | | 9/2012 | |
| WO | WO-2022109452 A2 | * | 5/2022 | B65G 1/12 |

OTHER PUBLICATIONS

Thable, et al., "System and Method for Multi-Rack Storage", U.S. Appl. No. 19/236,841, filed Jun. 12, 2025.

* cited by examiner

200

SYSTEM AND METHOD FOR NAVIGATING IN 3D FROM ANY CELL TO ANY CELL WITH A SINGLE MATERIAL HANDLING ROBOT

CROSS REFERENCE TO RELATED APPLICATIONS

The present application claims the benefit of and priority to U.S. Provisional Application Ser. No. 63/419,639, entitled "SYSTEM AND METHOD FOR NAVIGATING IN 3D FROM ANY CELL TO ANY CELL WITH A SINGLE MATERIAL HANDLING ROBOT," filed on Oct. 26, 2022, which is hereby incorporated by reference in its entirety.

TECHNICAL FIELD

This disclosure generally relates to robotic movement technology, and more particularly to systems and methods for navigating a single material handling robot in a three-dimension environment from any cell to any cell in an automated 3D storage and retrieval system.

BACKGROUND

An automated storage and retrieval system (AS/RS) is a material storage system designed for automated storage and retrieval of goods or items in manufacturing, distribution, retail, and wholesale facilities. AS/RS system generally includes one or more automated storage and retrieval machines (such as guided vehicles, shuttles, robots, conveyors, elevators, and/or lifts) operating under computerized control that directs the machine to a location where goods or items loaded on a pallet or tray are to be stored and/or retrieved later. For example, to store an item(s), a pallet or tray loaded with the item may be placed at an input station for the storage and retrieval system, and the information for the item is then entered into a computer terminal to determine a suitable location for storing the item. The automated storage and retrieval machine then automatically moves the pallet or tray to the determined location and stores the load (with or without the pallet or tray). Retrieval of the item can be accomplished later by specifying the location, where a same or different automated storage and retrieval machine may automatically navigate to the location and move the load away from the stored location.

With the advancement of automation technology, existing AS/RS systems have been able to configure a warehouse management system with strategies and processes that can automate different aspects of warehouse operation, including item stocking and retrieval. For example, certain automated storage and retrieval machines can automatically lift and move a pallet with a load. However, in the existing AS/RS systems, the automated storage and retrieval machines are limited to traverse along a limited number of directions (e.g., only move horizontally along certain directions or paths), since the pallets or trays with loaded items in these systems are simply placed on a shelf, which generally limits the available directions for moving a pallet (e.g., move up and move down are generally blocked by the shelf).

Therefore, there is a need for an improved automation technology that allows an automated storage and retrieval machine to move a pallet or tray along all possible directions in an automated storage and retrieval system.

SUMMARY

To address the aforementioned shortcomings, a method and system for storing material in an automated storage and retrieval system is provided. The system includes a multi-level storage rack including a plurality of cuboid cells and a material handling robot configured to navigate along a vertical direction or a horizontal direction from a first cuboid cell to a second cuboid cell of the multi-level storage rack. The method includes, when the navigation from the first cuboid cell to the second cuboid cell is a vertical navigation, engaging a set of second engagement structures disposed at corners of the material handling robot with a set of first engagement structures disposed along structural columns of the first cuboid cell, and driving the second engagement structures to rotate along the structural columns of the first cuboid cell to vertically move the material handling robot from the first cuboid cell to the second cuboid cell.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
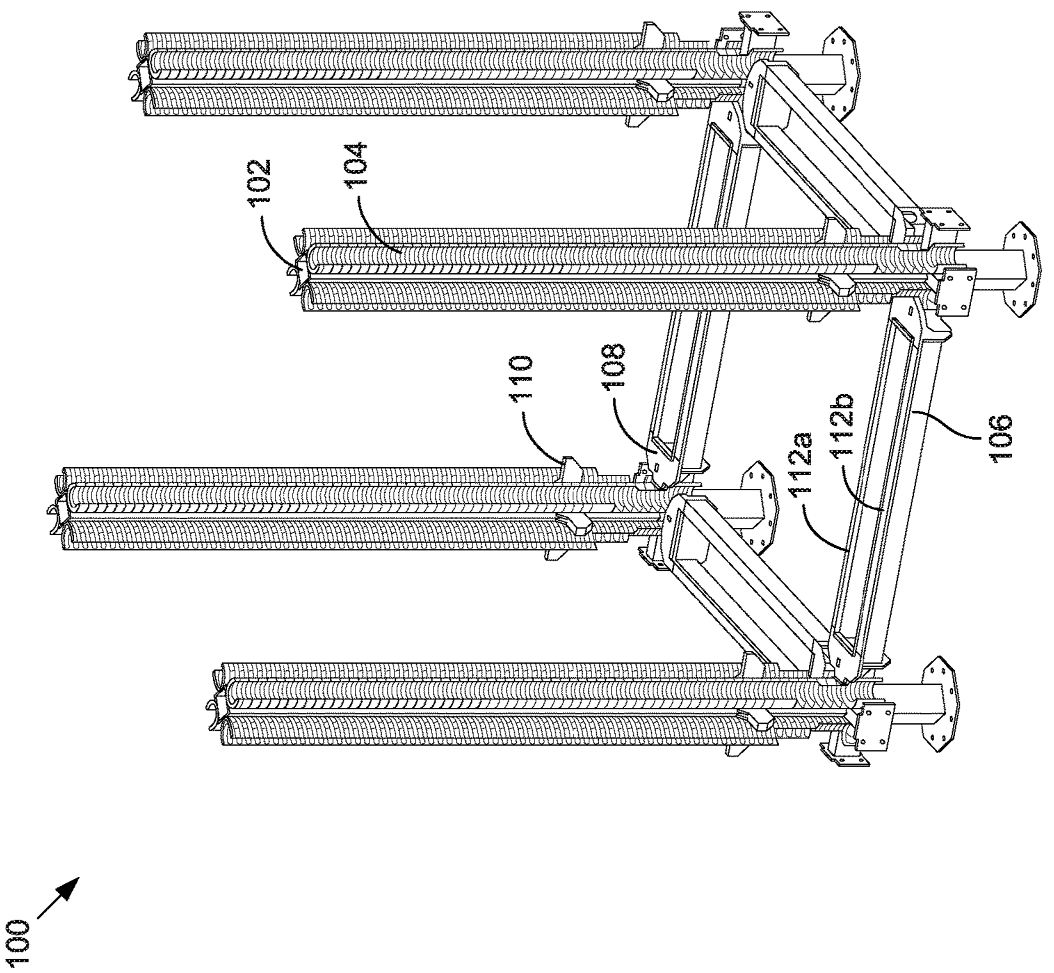
FIG. 1 illustrates an exemplary architecture of a cuboid cell of a multi-level storage rack, according to some embodiments.

The figures (FIGS.) and the following description relate to some embodiments by way of illustration only. It is to be noted that from the following description, alternative embodiments of the structures and methods disclosed herein will be readily recognized as viable alternatives that may be employed without departing from the principles of the present disclosure.

Reference will now be made in detail to specific embodiments, examples of which are illustrated in the accompanying figures. It is to be noted that wherever practicable, similar or like reference numbers may be used in the figures and may indicate similar or like functionality. The figures depict some embodiments of the disclosed structures or systems (or methods) for purposes of illustration only. One skilled in the art will readily recognize from the following description that alternative embodiments of the structures and methods illustrated herein may be employed without departing from the principles described herein.

Over the past decade, there has been a rapid increase in the eCommerce and omni-channel delivery on the order fulfillment processes. Correspondingly, many automated storage and retrieval systems emerge, which facilitates automation of different aspects of warehouse operation, including item stocking and retrieval. However, as described above, the existing AS/RS systems still have certain limitations, such as limited movement direction and possible pathways for automated storage and retrieval machines.

The present disclosure addresses the aforementioned problems and other problems of the existing AS/RS systems by providing a system and method for navigating in a three-dimensional (3D) environment from any cell to any cell with a single material handling robot. According to some embodiments, the disclosed automated 3D storage and retrieval system may be a part of a material and conveyance and storage system that uses an automated material handling robot to store materials in a repeating structure (with repeated units such as cuboid cells) for retrieval at a later time. The automated material handling robot may transport the materials (also referred to as payload) by carrying the payload while traversing the repeating structure along any axis (e.g., +/−, X, Y, Z) from any cell to any adjacent cell. Here "+/−" may mean a forward/backward, left/right, or upward/downward navigation of a material handling robot along each X, Y, or Z axis in a 3D environment.

According to some embodiments, the repeating structure of the disclosed automated 3D storage and retrieval system may be constructed based on a cuboid cell that is repeated to form a larger structure in a 3D array, so as to form a multi-level storage rack for item storage. According to one embodiment, the cuboid cell may be a rectangular cuboid cell having different sizes in three dimensions (e.g., length, width, and height) where each dimension can be flexibly configured so that the repeating structure may have different shapes and sizes, or the cuboid cell may be a cubic cell that has two dimensions (e.g., length and width) or even three dimensions having the same size. To form the repeating structure, multiple cuboid cells can be aligned in rows, columns, and depth, which are also configurable, so that the repeating structure is designed to be modular for being easily adaptable to constraints in existing buildings, such as irregular walls, ceiling heights, or building mechanical elements.

According to some embodiments, each cuboid cell may be designed to store material, as well as to allow an unloaded material handling robot to pass through (e.g., through trails built into the frame structure of a cuboid cell) when there are materials stored therein, or to allow a loaded material handling robot to traverse when there is no material stored therein. In other words, a cuboid cell disclosed herein is not just a storage location as other storage cuboids in other existing AS/RS systems, but can also be a thoroughfare for a material handling robot to pass through, depending on the needs. The specific structure of the disclosed repeating structure and the cuboid cells included therein are further described in details with reference to FIGS. 1A-1B.

FIG. 1 illustrate an example architecture of a cuboid cell (or atomic unit) 100, according to some embodiments. As illustrated in the figure, the cuboid cell 100 may include four structural columns 102, first engagement structures 104 surrounding each column, four beam assemblies 106 connecting bottom portions of the structural columns 102, and nodes 108 to make connections between the structural columns 102 and the beam assemblies 106. As illustrated in FIG. 1, there may be two nodes disposed on two opposite sides of a beam assembly 106, and thus there may be totally eight nodes when there are four structural columns 102 and four beam assemblies 106 for a cuboid cell 100.

Figure 11:
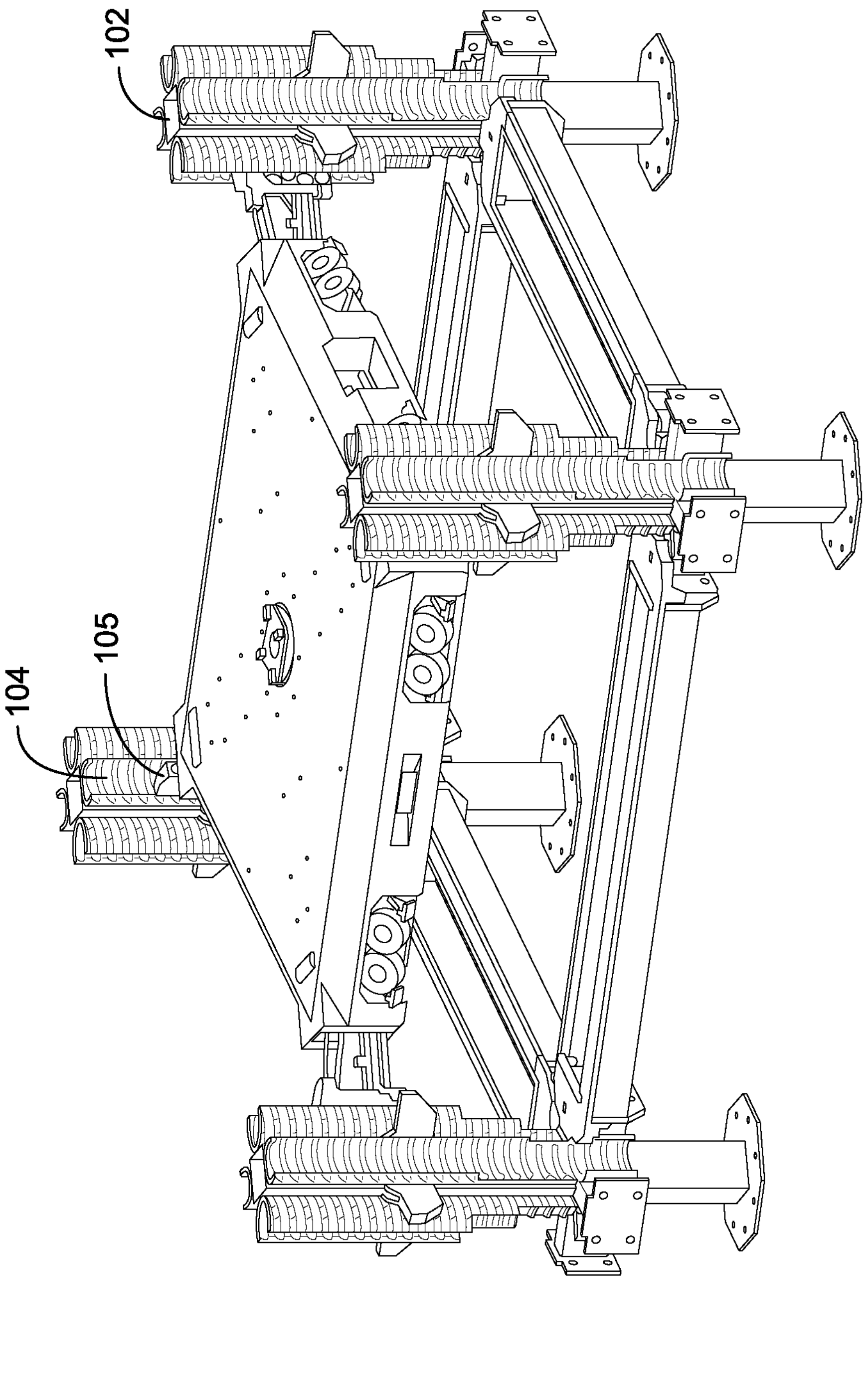
FIG. 11 illustrates an exemplary structure assembly according to some embodiments.

According to some embodiments, a method for storing material in an automated storage and retrieval system, a system comprising a multi-level storage rack (e.g., an example is shown in FIG. 11) including a plurality of cuboid cells and a material handling robot configured to navigate along a vertical direction or a horizontal direction from a first cuboid cell to a second cuboid cell of the multi-level storage rack, and the method comprising: when the navigation from the first cuboid cell to the second cuboid cell is a vertical navigation, engaging a set of second engagement structures 105 disposed at arms extending outward from corners of the material handling robot with a set of first engagement structures 104 disposed along structural columns of the first cuboid cell; and driving the second engagement structures 105 to rotate along the structural columns of the first cuboid cell to vertically move the material handling robot from the first cuboid cell to the second cuboid cell.

According to some embodiments, a cuboid cell 100 may further include fixing members 110 attached to each column for securing a payload in storage. The fixing members 110 may mate with articulated arms of a pallet support tray for storing a pallet(s) in a tray when storing items in the cuboid cell.

The structural columns 102 and the beam assemblies 106 may have different shapes and/or sizes. For example, each column 102 may have a square shape, a circle shape, or an ellipse shape, or other possible shapes. In addition, the inner part of column 102 may be hollow or empty or may be not empty. The length of each column 102 may vary and have different lengths between different cuboid cells. For example, one level (e.g., a top level) of cuboid cells in a multi-level storage rack may have a different height when compared to another level within the same multi-level storage rack. Additionally or alternatively, between different storage systems or facilities, different multi-level storage racks may also have different heights, even when each level has the same height within a same multi-level storage rack. Similarly, in some embodiments, the lengths of each beam assembly 106 may also vary and may have different lengths between different rows of cuboid cells within a same multi-level storage rack, and/or between different multi-level storage racks. Accordingly, in the disclosed automated 3D storage and retrieval system, the cuboid cells may be configured to have a different shape and/or size, as long as it does not affect the movement of a material handling robot within the storage and retrieval system.

In some embodiments, the size of a material handling robot may be also configurable, and thus the disclosed automated 3D storage and retrieval system may provide a great flexibility to meet the needs of customers from different industries or fields. For example, a series of material handling robots with different sizes may be designed in advance, and the lengths of the beam assemblies and the heights of the structural columns may be further configured based on the configured size for each material handling robot, so as to meet the needs from different customers.

According to some embodiments, each beam assembly 106 may have one or more structural beams and a rail built into each structural beam for a material handling robot to navigate along. In the illustrated embodiment in FIG. 1, a beam assembly 106 includes two separate beams 112*a*/112*b* that join together at a node 108 on two sides. Wheels of a material handling robot may navigate along an inner beam 112*a* of the beam assembly 106 when the material handling robot transverses the cuboid cell, while the outer beam 112*b* of the beam assembly may serve as a rail of an adjacent cell (not shown). As will be described in detail later, each material handling robot may include a set of wheels on each of the four sides of the material handling robot for horizontal navigation. Accordingly, when a material handling robot horizontally navigates along one direction, two sets of wheels from two opposite sides of a material handling robot may move along inner beams of two beam assemblies located on the opposite sides of the material handling robot.

In some embodiments, each beam 112*a*/112*b* may have a flat surface that flushes with the surface of a node 108, so that a material handling robot can smoothly navigate through one or more nodes 108 located at a joint site between two adjacent cells.

In some embodiments, to ensure that a material handling robot does not navigate away from a rail, each beam 112*a*/112*b* may optionally include a flange on one edge (e.g., an edge facing towards the center of the cuboid cell 100) or on both edges of a beam 112*a*/112*b*. In some embodiments, a node 108 may also optionally include a flange to guide the navigation of a material handling robot. For example, for a portion of an edge that does not directly contact with an edge of an adjacent node, that portion may include a flange to prevent a material handling robot from falling off the structural beams.

In some embodiments, each node 108 may include two angled edges as shown in FIG. 1, where each edge may have a shape that is configured to match the shape of an edge of an adjacent node, so that the two adjacent nodes 108 at a joint site form a flat surface with a minimized gap between the adjacent nodes. This allows a material handling robot to smoothly pass through a joint site to an adjacent cell. In one example, each angled edge of a node 108 may have a 45-degree angle with respect to a side of the node that joins the two beams 112*a*/112*b*. In some embodiments, a node 108 may have other shapes and/or angles as long as the two adjacent edges of two adjacent nodes can form a flat surface to allow a material handling robot to smoothly navigate through a joint site.

In some embodiments, instead of building flanges, a rail may be configured to have a groove structure, so as to prevent a material handling robot from navigating away from the rail. Under such a configuration, a node 108 may also have a groove that joins to a groove built into a structural beam 112*a*/112*b*.

With respect to the fixing member 110, each column 102 may include four fixing members 110 in four different directions, where each of the four fixing members 110 may be used to secure a payload in a corresponding storage cell. Accordingly, there are totally four fixing members 110 that are used to hold or secure a payload from four different corners when a payload is stored in a cuboid cell. In some embodiments, the payload may be a tray that includes articulated arms that can extend and/or rotate to mate with the fixing members included at four structural arms, so as to secure the payload between the four fixing members within a cuboid cell.

In some embodiments, each fixing member 110 may be vertically aligned along a direction away from the center of the cuboid cell. For example, each fixing member 110 may form an approximately a 15-degree (or 20-degree, 25-degree, 30-degree, or another degree) angle with respect to a beam assembly 106, but not a 45-degree angle. This design is purposed to allow a first engagement structure to be positioned at a 45-degree angle towards the center of the cuboid cell, which facilitates the engagement of a material handling robot with the structural columns during a vertical movement, as will be described in detail later. Accordingly, in some embodiments, the four first engagement structures and four fixing members may be alternately disposed around a structural column 102, where the four first engagement structures are disposed at a 45-degree with respect to an extension direction of a beam assembly 106, while the four fixing members may be disposed in a direction a little away from a 45-degree direction towards the center of the cuboid cell 100.

In some embodiments, the fixing members 110 may be disposed at a certain distance from the top surface of the beam assemblies 106 or the nodes 108, and the exact distance may depend on the overall height of a material handling robot in a resting or loading/unloading state. For example, the distance between the top surface of the fixing members 110 and the top surface of the beam assemblies 106 may be a little larger than the overall height of the material handling robot in a resting state when the material handling robot is unloaded, so that the unloaded material handling robot can freely navigate underneath if there is a payload stored in a cuboid cell. On the other hand, the distance may be also a little smaller than the overall height of the material handling robot in a loading/unloading state (the top surface of the material handling robot may be lifted a little at the loading/unloading state) when the material handling robot is loading/unloading a payload onto/from the fixing members 110.

In some embodiments, the cuboid cell 100 disclosed herein may also include first engagement structures 104 vertically disposed along the structural columns 102, as described earlier. These first engagement structures 104 may provide a mechanism for a material handling robot to move vertically, as will be described in later in FIGS. 5A-7B.

It should be noted that the cuboid cell 100 illustrated in FIG. 1 may be a base unit or ground unit that is configured for the ground level. For other units that are not configured for the ground level, it may have different configurations or structures. For example, for the lower portions of the structural columns 102 that do not have the first engagement structures in the illustrated cuboid cell in FIG. 1, they may not exist in other cuboid cells for the upper levels of the disclosed multi-level storage rack. In other words, for cuboid cells configured for upper levels, these cuboid cells may have first engagement structures surrounding the whole structural columns 102, so that a material handling robot can horizontally move between different levels of cuboid cells without interruption.

Figure 2:
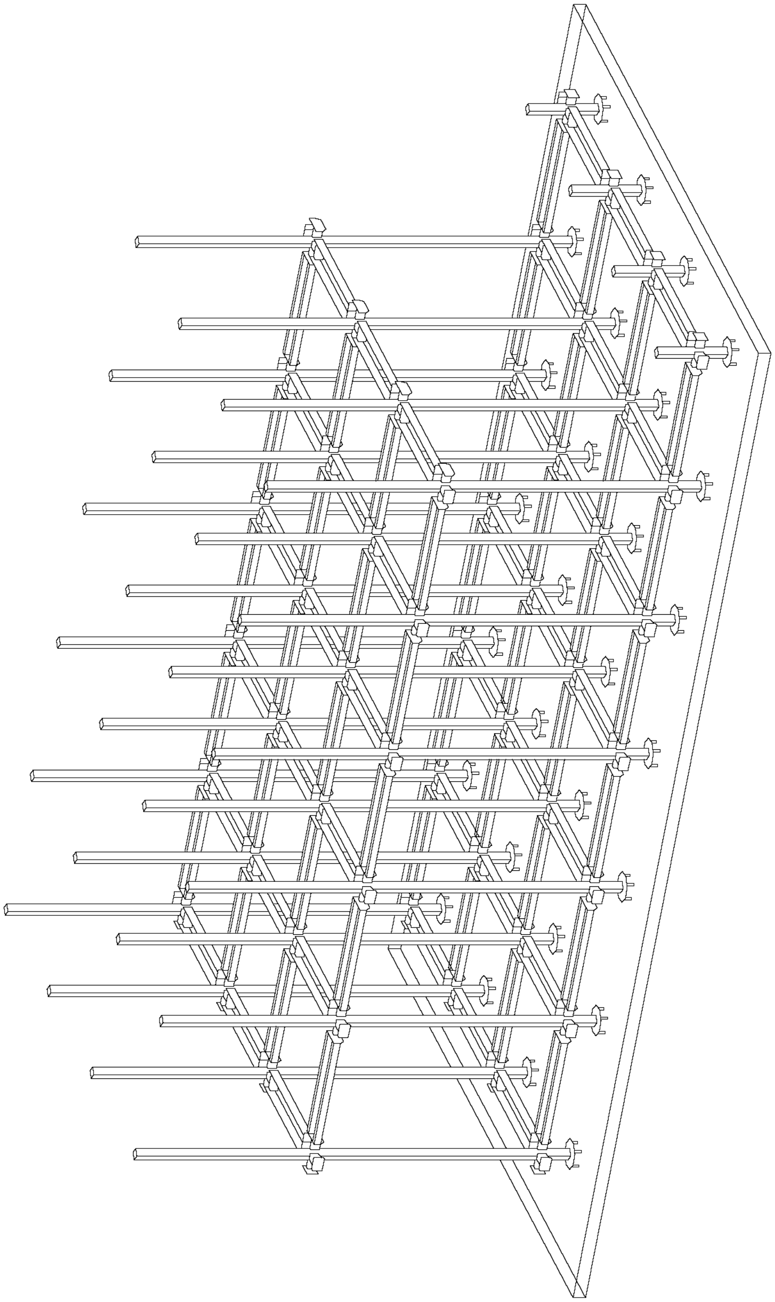
FIG. 2 illustrates an exemplary architecture of a multi-level storage rack, according to some embodiments.

Referring now to FIG. 2, an exemplary multi-level storage rack 200 built upon cuboid cells shown in FIG. 1 is further illustrated, according to some embodiments. In FIG. 2, the exemplary multi-level storage rack 200 is three cells in depth, six cells in width, and two cells in height (for a small portion, only one cell in height). It should be noted that the automated 3D storage and retrieval system disclosed herein is not limited to the structure shown in FIG. 2, but rather can have any number of cells in each dimension for the disclosed multi-level storage rack 200.

In some embodiments, the larger racking structure of the multi-level storage rack 200 may sit on a load-bearing structure, which can be either a new or an existing concrete slab or foundation element. In some embodiments, the larger racking structure of the multi-level storage rack 200 may be designed to have a lateral stability system in the form of either a moment frame, a braced frame, or a combination of both. A moment frame is a structure configured to resist bending moments, for example, a structure that is configured to carry vertical and horizontal loads in a same plane but may also be drawn on to provide resistance to horizontal loads out of the plane of the frame. A braced frame is a structural system designed to resist wind and earthquake forces. Members in a braced frame are not allowed to sway laterally (which can be done using shear wall or a diagonal steel sections, similar to a truss). In the disclosed automated 3D storage and retrieval system, diagonal sections may be applied to the outermost sides of the larger racking structure the multi-level storage rack 200. That is, the diagonal sections will not be applied to a side shared by two adjacent cuboid cells. This then allows a material handling robot to move between the two adjacent cuboid cells. Under certain circumstances, if necessary, diagonal sections may be possibly installed internal to the system in a limited quantity to provide backing. This may block certain movements between two adjacent cells at the installed locations, but still permit movements between most other adjacent cells.

Figure 3A:
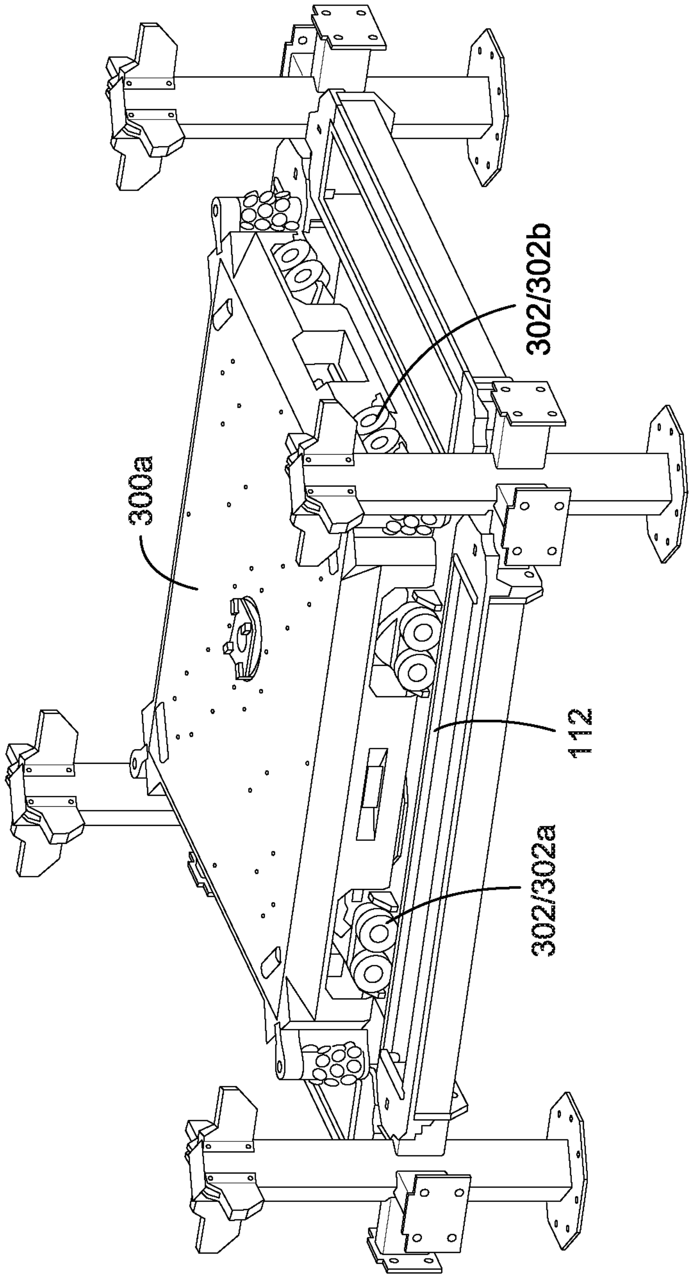
FIG. 3A illustrates an exemplary material handling robot that is captive and traveling on beam structural rails, according to some embodiments.

FIG. 3A illustrates an exemplary material handling robot 300*a* that is captive and traveling on wheels 302 on beam structural rails, according to some embodiments. In the figure, the material handling robot 300*a* travels in the XY plane (i.e., horizontal plane) on the rails (e.g., grooves or tracks) built into the structural beams 112 on the horizontal axis.

The material handling robot 300*a* may travel on top of the rails built into the structural beams 112 during a horizontal navigation. The rails for the horizontal navigation may be configured to have a retaining structure (e.g., flange) forming a track for the wheels 302. Alternatively, the rails may be grooves built into the structural beams.

The wheels for the material handling robot 300*a* may have a configuration that facilitates the movement along X and Y axes. In one example, the material handling robot 300*a* may have four set of wheels disposed on each of the four different sides of the robot. When the material handling robot 300*a* navigates along one horizontal direction (e.g., left direction in FIG. 3A), only two sets of wheels (e.g., wheels 302*a*) from two opposite sides (one set not shown in FIG. 3A) are engaged with the rails built into the structural beams 112. The other two sets of wheels (e.g., wheels 302*b*) are disengaged (e.g., retracted into the hiding place for these wheels) with the rails, and thus do not contribute to the robot movement. When changing a navigating direction, the two disengaged wheel sets may be first actuated to engage with the rails built into the structural beams, the other two wheel sets that have previously engaged with the rails may be then actuated to a disengaged position. In other words, wheel sets are articulated to different possible states (e.g., engaged and disengaged with rails) based on the direction of travel, so that only wheels in alignment with the direction of travel are engaged during the robot movement. Unused wheel sets are actuated to a disengaged position (e.g., in the hiding place) to provide clearance, so as not to hinder or interfere with the movement of the material handling robot 300*a* along the expected direction.

From the above description, it can also be seen that when the material handling robot 300*a* is captive (e.g., navigating within the disclosed storage structure 200), the robot generally changes the direction of navigation when the robot is in a cuboid cell with all wheels are at positions to be capable of engaging with the rails built into the structural beams.

In some embodiments, the above described wheel actuation mechanism may also be applied to a situation where the material handing robot 300*a* navigates on the ground or other places that do not include rails built into the beam structures, that is, when the robot is not captive. In such situations, also only two sets of wheels are actuated to a engaged position while the other two sets of wheels are not engaged with the ground or other places so as not to hinder or interfere with the navigation of the material handling robot 300*a*.

Under certain circumstances, the material handling robot 300*a* may be not moving (e.g. waiting for other robots to clear the way). At such situations, all wheel sets may be actuated to a engaged position, so as to provide a better support for the materials loaded onto the material handling robot 300*a*. Under certain circumstances, the material handling robot 300*a* may be not moving and not loaded with materials. Under such circumstances, not all wheel sets are necessarily actuated to a engaged position.

While not illustrated in FIG. 3A, in some embodiments, some or all wheel sets 302 may be controlled to rotate with proper configuration. This may facilitate the material handling robot 300*a* to navigate along any possible direction when the robot is not captive (e.g., not restricted to navigate along rails built into the structural beams). For example, when the material handling robot 300*a* navigates on the ground, by enabling the robot to move along various different directions through wheel rotation, it may allow the robot to take a more direct route to get to a target location, instead of merely moving along a L-type route. This saves the energy and likely also the time, since it does not require frequent engaging and/disengaging of the wheel sets required by moving a robot along a L-type route.

As will be described later, if the material handling robot 300*a* navigates along a vertical direction (or Z axis), all wheels configured for horizontal navigation (e.g., wheels 302*a* and 302*b*) may be actuated to a disengaged position, so as not to hinder or interfere with the movement of the material handling robot along the vertical direction.

While not illustrated, in some embodiments, the top surface of the material handling robot 300*a* may be also actuated to two different states, e.g., a resting state and a loading/unloading state, as described earlier. When the material handing robot 300*a* is in the resting state, the robot may be not loaded with a payload, and the top surface of the robot may be lowered down when compared to the robot at a loading/unloading state. The lower top surface may allow the material handling robot 300*a* to freely navigate along any cuboid cell, even a cell that is occupied by a payload. For example, due to the lower top surface, the material handling robot 300*a* may freely navigate underneath the material stored in a cuboid cell. On the other hand, when the material handling robot 300*a* is in the loading/unloading state, the top surface of the robot may be lifted up. This may allow the loaded material to be secured through the fixing members attached to the columns of a cuboid cell, or allow the secured materials to be released from the fixing members of the cuboid cell.

In some embodiments, the top surface of the material handling robot 300*a* may be actuated to a resting state even when the robot is loaded with a payload but is not in the action of loading the payload to the fixing members of a target cuboid cell. For example, when the material handling robot 300*a* is not at a target cuboid cell and is not preparing for storing the material, even if the material handling robot 300*a* is loaded with a payload, the material handling robot may be still in the resting state. This may save the energy for moving a payload along different unoccupied cuboid cells before reaching the target cuboid cell.

In some embodiments, the material handling robot 300*a* may include additional elements not illustrated in FIG. 3A or described above. For example, according to some embodiments, the material handling robot 300*a* may include certain controlling mechanisms, communication mechanisms, power supply, and so on. The control mechanisms may control the navigation and the operation of the material handling robot 300*a*, which may include but not limited to controlling the robot to move along a specific route, to stop and wait another robot under certain circumstances, to change a navigation direction, to navigate to a pick up location, to lift up a payload for storage, to enter into an idle state, etc. In some embodiments, the control mechanisms of the material handling robot 300*a* may be configured through an independently operating controller included in the robot, and/or through a microcontroller that communicates with a backend server for signals and instructions for one or more possible actions.

The communication mechanisms of the material handling robot 300*a* may allow the robot to communicate with other components related to the material storage, which may include a backend server, another material handling robot, and certain online service providers. For example, the material handling robot 300*a* may receive the shipping information from online and look for the ordered item(s) stored in the storage and retrieval system, and thus can determine where to retrieve the ordered item(s) in advance. In some embodiments, various communication mechanisms may be employed by the material handling robot 300*a*, which include but not limited to certain wired or wireless communications.

Figure 3B:
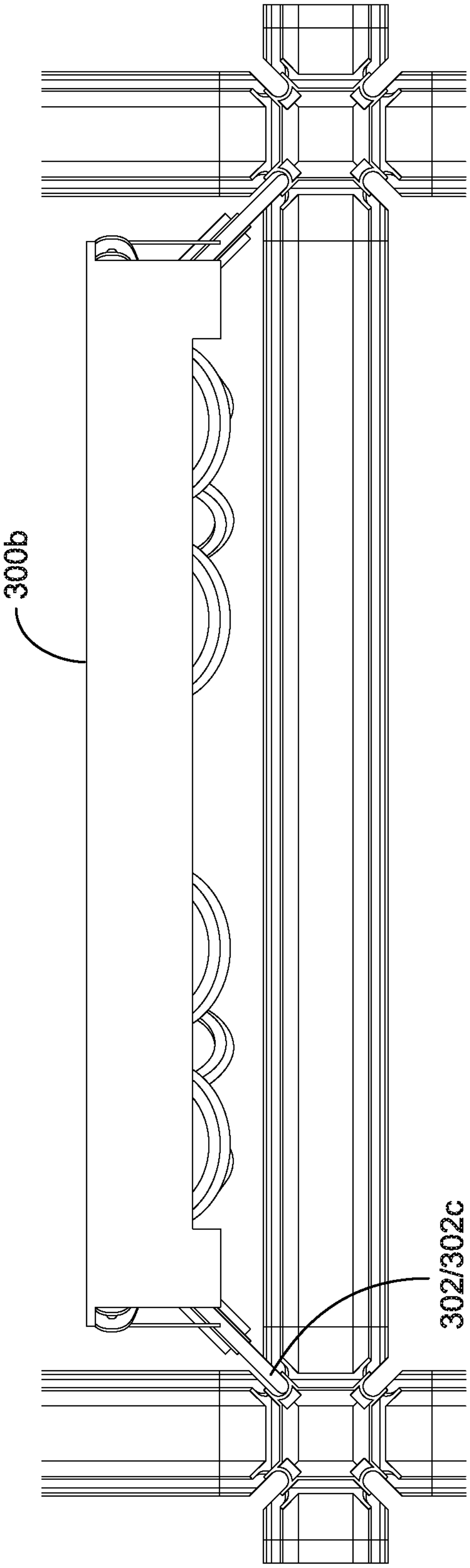
FIG. 3B illustrates an exemplary material handling robot with angled wheels, according to some embodiments

Referring now to FIG. 3B, another exemplary material handling robot 300*b* with angled wheels is illustrated, according to some embodiments. The material handling robot 300*b* is also illustrated as being captive and traveling on wheels on beams, for example, on the rails built into the structural beams. Different from the wheels 302*a*/302*b* illustrated in FIG. 3A, the wheels 302*c* in FIG. 3B are angled wheels. In other words, these wheels are not vertically aligned when the material handling robot 300*b* navigates along the rails built into the structural beams. Instead, these wheels are angled at a certain degree, e.g., 45-degree incline to normal as illustrated in FIG. 3B, or another different degree which is not limited in the present disclosure. In some embodiments, to accommodate the angled wheels, the rails built into the structural beams may be in grooves. These grooves may be also angled (e.g., have a same angle as the angled wheels) when being built into the structural beams, so that the angled wheels can fit into these grooves for guiding the navigation of the material handling robot 300*b*.

In some embodiments, by using angled wheels and angled grooves, the movements of material handling robot 300*b* is more restricted. This is very important, especially considering that the rails built into the structural beams are generally narrow and the material loaded onto a material handling robot can be quite heavy. This can make sure that a material handling robot 300*b* does not fell off the structural beams, which is very important for the disclosed storage system due to the absence of the board or other structures between different levels that can protect the lower cuboid cells or materials stored therein from being damaged by the falling material handling robot and the material loaded thereon. In some embodiments, the angled wheels and/or angled grooves may provide certain other benefits, such as improved handling and traction of the material handling robot 300*b* in certain moving scenarios.

Figure 4:
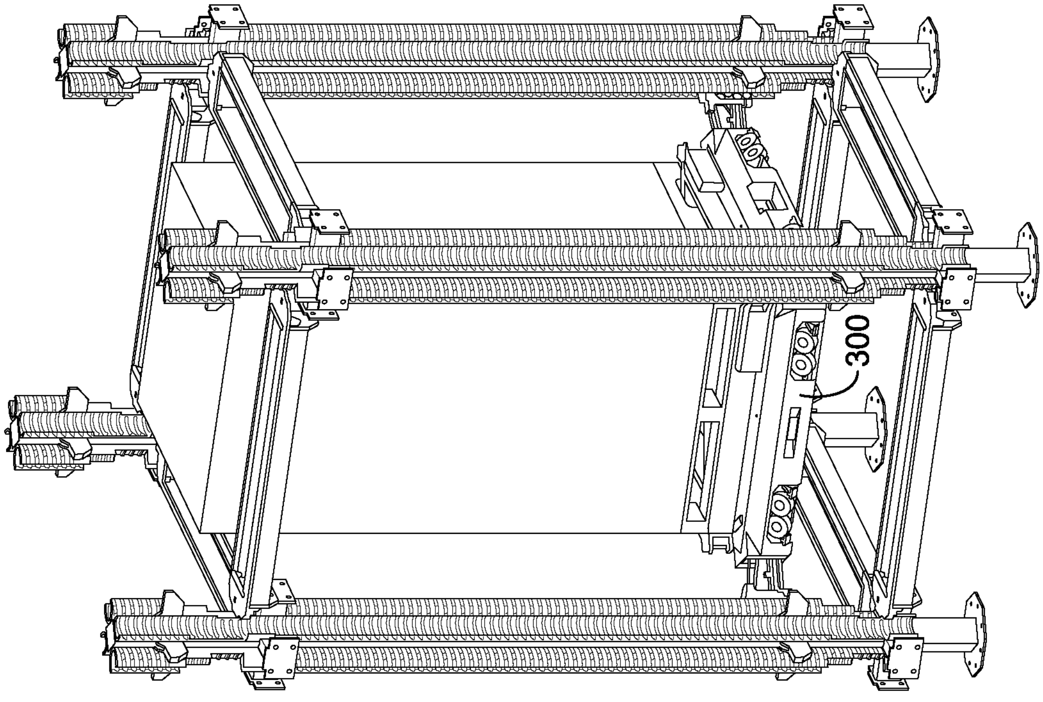
FIG. 4 illustrates an exemplary material handling robot that is navigating along a Z axis, according to some embodiments.

FIG. 4 illustrates an exemplary material handling robot 300 that is navigating along a Z axis, according to some embodiments. That is, besides moving in a XY-plane in horizontal directions, the material handling robot 300 disclosed herein may also move along a Z axis or a vertical direction in a 3D environment. This then increases possible routes for the disclosed material handling robot in the disclosed storage system when compared to other existing robots or vehicles. For example, if an adjacent cell has certain material stored therein, which then blocks a robot to move in that direction. An empty cell behind the adjacent cell may be inaccessible for the robot to move into for material storage. However, if an upper cell and its adjacent cell(s) are not occupied, the material handling robot 300 disclosed herein may move up, pass through one cell, and then move down to the cell next to the adjacent cell, and store material there. Accordingly, by employing additional vertical navigations, the disclosed storage system improves the accessibility of certain cuboid cells that are used to be inaccessible if a robot is not permitted to move up/down, as many other existing robots or vehicles do. The various application scenarios for moving a robot from any cell to any other cell, including certain vertical navigations, are further described in detail later in FIGS. 9A-9D.

As described earlier and as also illustrated in FIG. 4, when the material handling robot is configured to move along a vertical direction, the wheel sets disposed on different sides of the material handling robot 300 may be actuated to a disengaged position. That is, these wheel sets are retracted into the respective hiding place located close to the sides of the robot 300, to provide clearance so as not to hinder or interfere with the movement of the material handling robot 300*a* along the vertical direction.

In the disclosed automated 3D storage and retrieval system, different Z mechanisms may be engaged for navigating a material handling robot 300 (with or without a payload) in the vertical direction between cuboid cells. According to one embodiment, a vertical movement may be enabled by disposing chains along the structural columns of cuboid cells, where a material handling robot may deploy a sprocket gear to engage with the chains on the columns. According to another embodiment, a vertical movement may be enabled by perforated holes (also referred to as perforations) disposed along the structural columns, where a material handling robot may deploy a sprocket gear to engage with the perforated holes in the column. According to yet one embodiment, a vertical movement may be enabled by spiral racks disposed around the columns, where a material handling robot may deploy a spiral worm gear to complementary racks disposed around the structural columns, to translate along the Z-axis using an actuator. The specific details of structures and actions performed by these components will be further described in detail later in FIGS. 5A-7B.

Compared to a horizontal navigation, a vertical climbing/descending along the structural columns of a cuboid cell generally require more energy. The material handling robot disclosed herein may be equipped with a power supply such as a battery for driving the robot to move upward. The battery may be a replaceable battery and/or a rechargeable battery. In some embodiments, when the material handling material moves downward or descends, positive forces use traction between the wheels and columns to control descent. Certain energy may be thus recovered from such movement, which may be used to recharge the robot's battery, to save the overall energy for operating these material handling robots. In some embodiments, a material handling robot may further include a regenerative brake, which may be configured to regenerate energy when the robot move downwards. The recovered power generated by the regenerative brake may be put back into the robot's battery or energy storage unit.

It is to be noted, the actuator used for the vertical navigation of the robot may be different from the actuator(s) used for the horizontal navigation (e.g., for engaging or disengaging of wheel sets with the rails). That is, there may be multiple different actuators included in the disclosed material handling robot, each of which may be independently controlled to independently actuate their respective components.

Figure 5A:
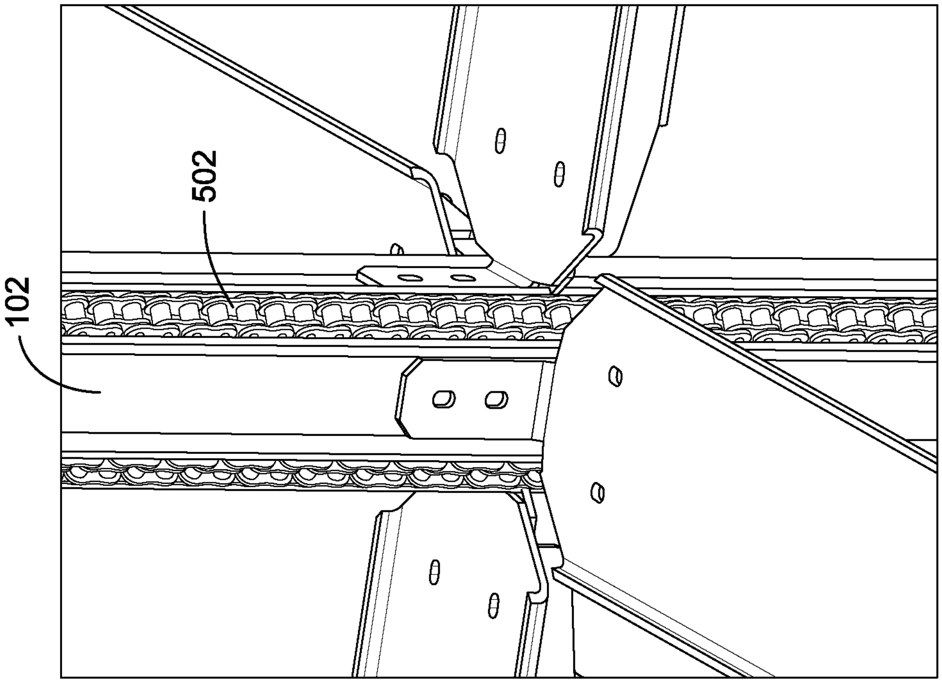
FIGS. 5A-5B illustrate an exemplary structure assembly for a chain-based vertical navigation, according to some embodiments.

FIG. 5A illustrates an exemplary structure assembly for a chain-based vertical navigation, according to some embodiments. As illustrated in the figure, a stationary roller chain 502 may be mounted to a column 102. During a vertical navigation, a material handling robot may deploy a gear (e.g., a sprocket gear) to engage with the stationary roller chain 502 to drive the robot to translate along the Z axis.

Figure 5B:
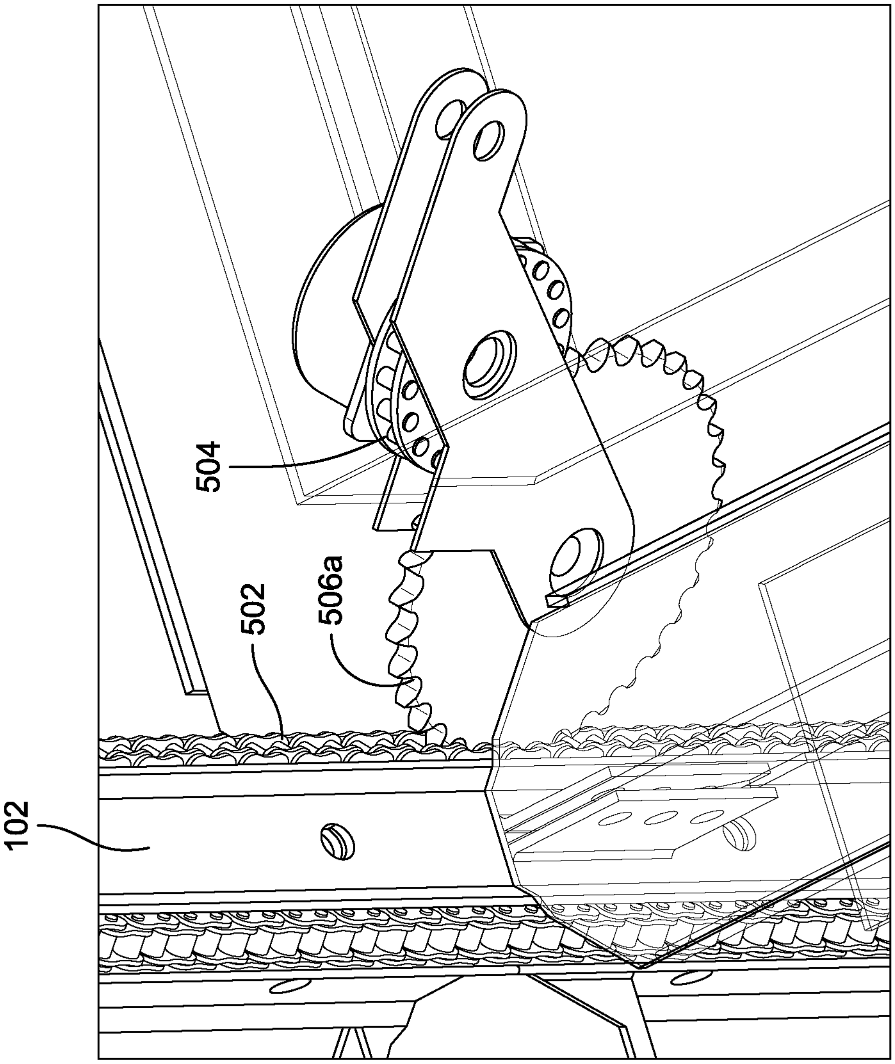

FIG. 5B illustrates an cutaway view showing an exemplary sprocket gear 506*a* engaged with a stationary roller chain 502, according to some embodiments. As illustrated, the material handling robot may include a drive gear 504 and a sprocket gear 506*a* driven by the drive gear. The sprocket gear 506*a* is a toothed wheel whose teeth engage in the links of the stationary roller chain 502 in FIG. 5B. When actuated by an actuator, the drive gear 504 and the sprocket gear 506*a* may be deployed to allow the sprocket gear 506*a* to engage in the links of the stationary roller chain 502 disposed along a structural column 102. The engagement may be tight so that the disengagement will not occur even when the material handling robot is loaded with heavy material. Towards this objective, the links of the stationary roller chain 502 may be relatively narrow and the teeth of the sprocket gear 506*a* may be relatively long. In addition, there are four sprocket gears disposed at four corners of the material handling robot, which together may provide a balanced support. The four sprocket gears 506*a* may simultaneously engage in the links of the stationary roller chain 502, to provide the enhanced engagement.

The four sprocket gears 506*a* of the material handling robot may be driven by the drive gear, which itself may be driven by a motor (not shown) included in the material handling robot. In some embodiments, there may be four motors (or a single overall motor) disposed inside the material handling robot for driving the drive gears 504, which further drives the sprocket gears 506*a* to rotate along the stationary chain. The rotation of the four sprocket gears 506*a* together navigates the material handling robot towards a upper cell during the vertical movement.

There may be different means for disposing a stationary roller chain 502 along a structural column of a cuboid cell. In one embodiment, the stationary roller chain 502 may be directly mounted onto a column through certain fixing mechanism. According to another embodiment, the stationary roller chain 502 may be disposed in a groove formed on one side of the column. Since each side may be equipped with a roller chain, there are totally four grooves formed along a structural column 102, each side with one groove. By disposing a roller chain within a groove, it may improve the stability of the vertical movement of the material handling robot by preventing (or minimizing) a chain from shaking during the movement. In some embodiments, there are other means to prevent a roller chain from shaking during a vertical navigation, e.g., by disposing two rows of piles or two dams on two sides of a roller chain.

Figure 6A:
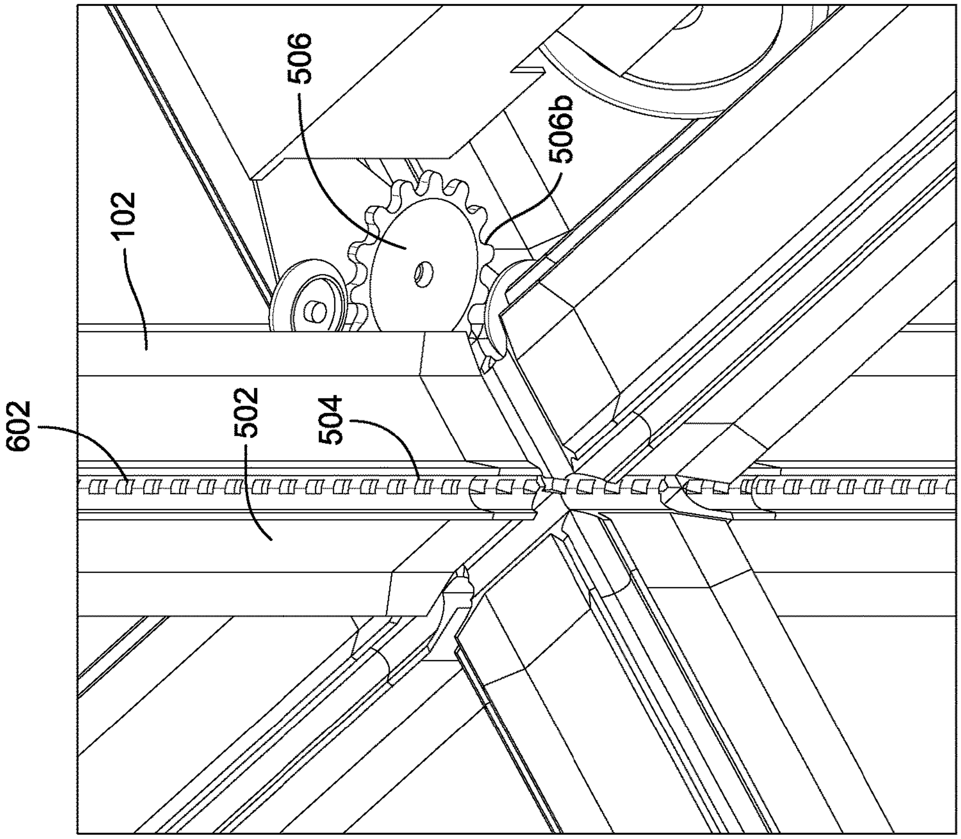
FIGS. 6A-6B illustrate an exemplary structure assembly for a perforation-based vertical navigation, according to some embodiments.

FIG. 6A illustrates an exemplary structure assembly for a perforation-based vertical navigation, according to some embodiments. As shown in FIG. 6A, instead of engaging with the links of chains, a material handling robot disclosed herein engages with perforated holes 602 formed or disposed along a structural column 102. Similar to a material handling robot illustrated in FIG. 5A, the material handling robot illustrated in FIG. 6A also includes a sprocket gear 506*b*, which may be a same or different sprocket gear shown in FIG. 5A. Although not shown in FIG. 6A, in some embodiments, the material handling robot disclosed herein may also include a drive gear that drives the sprocket gear 506*b*. In some embodiments, there may be no drive gear in the disclosed material handling robot in FIG. 6A, and the sprocket gear 506*a* itself is a drive sprocket that can be driven by a motor to rotate.

Figure 6B:
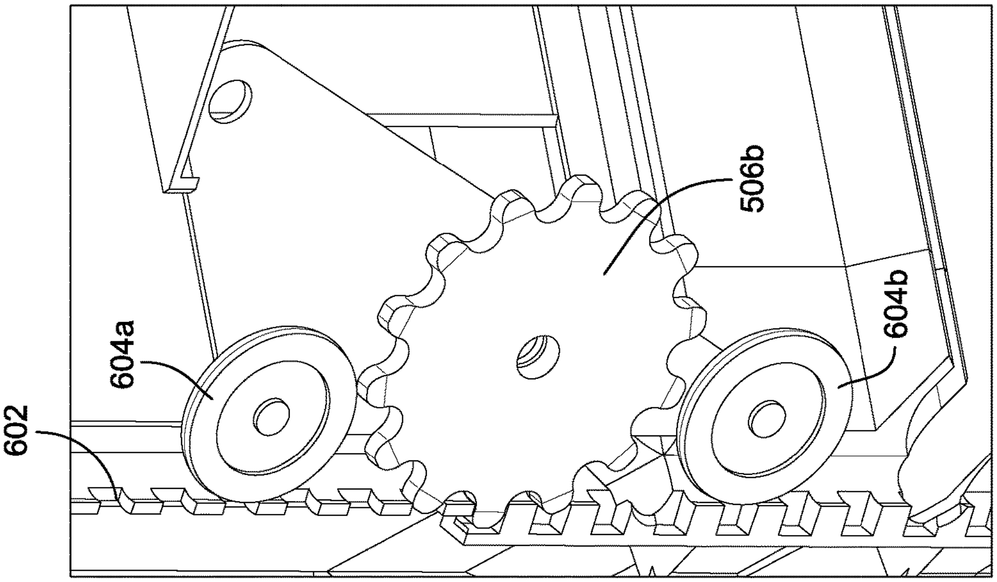

FIG. 6B illustrates a cutaway view showing an exemplary sprocket gear engaged in the perforated holes 602 along a structural column 102, according to some embodiments. The sprocket gear 506*b* may enmesh with perforated holes along the column, to provide a positive mechanical lock for controlling a vertical movement. These perforated holes may have a shape and/or size that matches the shape and/or size of the sprocket gear 506*b*, so that the teeth of the sprocket gear 506*b* may tightly fit into these holes during the vertical movement. Compared to the chain-based engagement shown in FIG. 5A, the perforation-based engagement may be more stable since these holes are fixed and may not move or shake as a chain.

As also illustrated in FIG. 6B, in some embodiments, the material handling robot disclosed herein may further include a pair of small guide wheels 604*a* and 604*b* for guide the sprocket gear 506*b* to move along the perforated holes. The two guide wheels 604*a*/604*b* do not include teeth, but rather are smooth rollers. The size of the two guide wheels 604*a*/604*b* may be smaller than the sprocket gear 506*b*. In one example, the guide wheels 604*a*/604*b* may have a diameter that is about half of the diameter of the sprocket gear 506*b*, or a little smaller or larger than that.

As illustrated in FIG. 6B, compared to other general holes that have a curved shape, these perforated holes in the structural column 102 may have a rectangular shape or square shape (although other shapes are also possible). In addition, as also illustrated in FIG. 6B, these holes may have one side open and thus look like a concaved structure. The open side faces away from the column, as also illustrated in FIG. 6B. Although not illustrated, similar to the sprocket gears in FIGS. 5A-5B, the material handling robot shown in FIGS. 6A-6B may also include four sprocket gears and four associated pairs of guide wheels for engaging with each structural column of a cuboid cell.

Figure 7A:
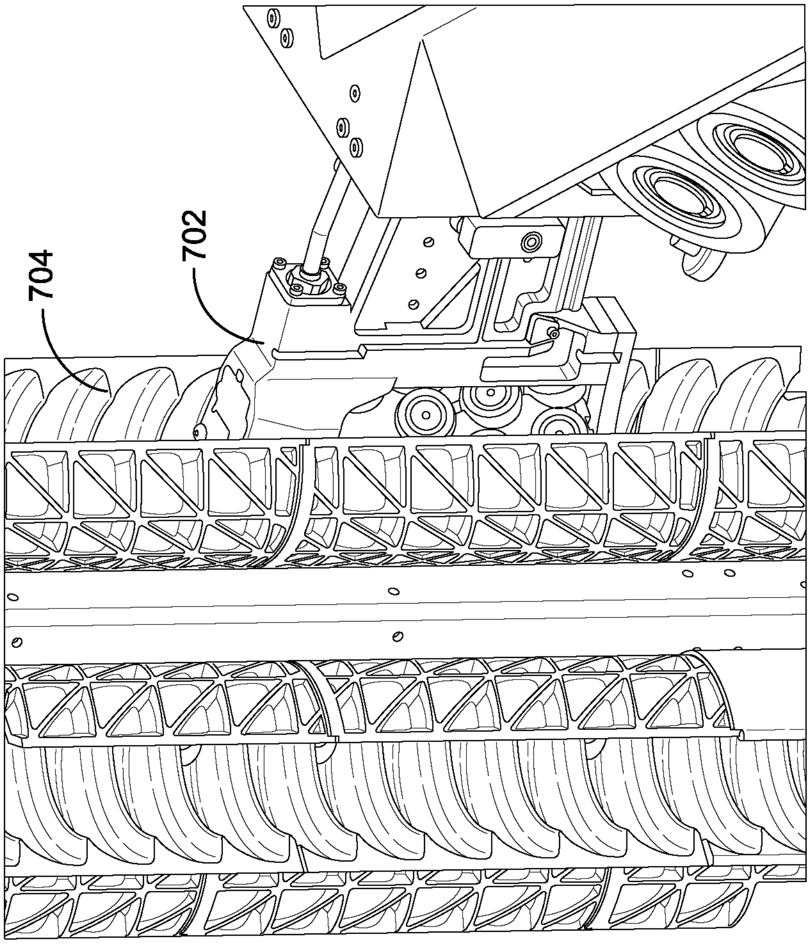
FIGS. 7A-7B illustrate an exemplary structure assembly for a worm gear-based vertical navigation, according to some embodiments.

FIG. 7A illustrates an exemplary structure assembly for a worm gear-based vertical navigation, according to some embodiments. As illustrated in the figure, in the worm gear-based vertical navigation, a worm gear 702 may extend from each corner of a material handling robot to engage in a helical rack gear 704 disposed along a structural column. As the worm gear 702 spins, the stationary helical rack gear 704 propels the worm gear 702 up or down in a vertical direction, depending on the spin direction of the worm gear 702. This then pushes the robot up or down in the vertical direction, thereby achieving a vertical navigation of the robot.

In some embodiments, to minimize friction and wear on the system, the worm gear 702 disclosed herein may use bearings along a spiral pattern. Additionally or alternatively, materials that minimize the friction may be further used to make the worm gear 702 as well as the helical rack gear 704.

Figure 7B:
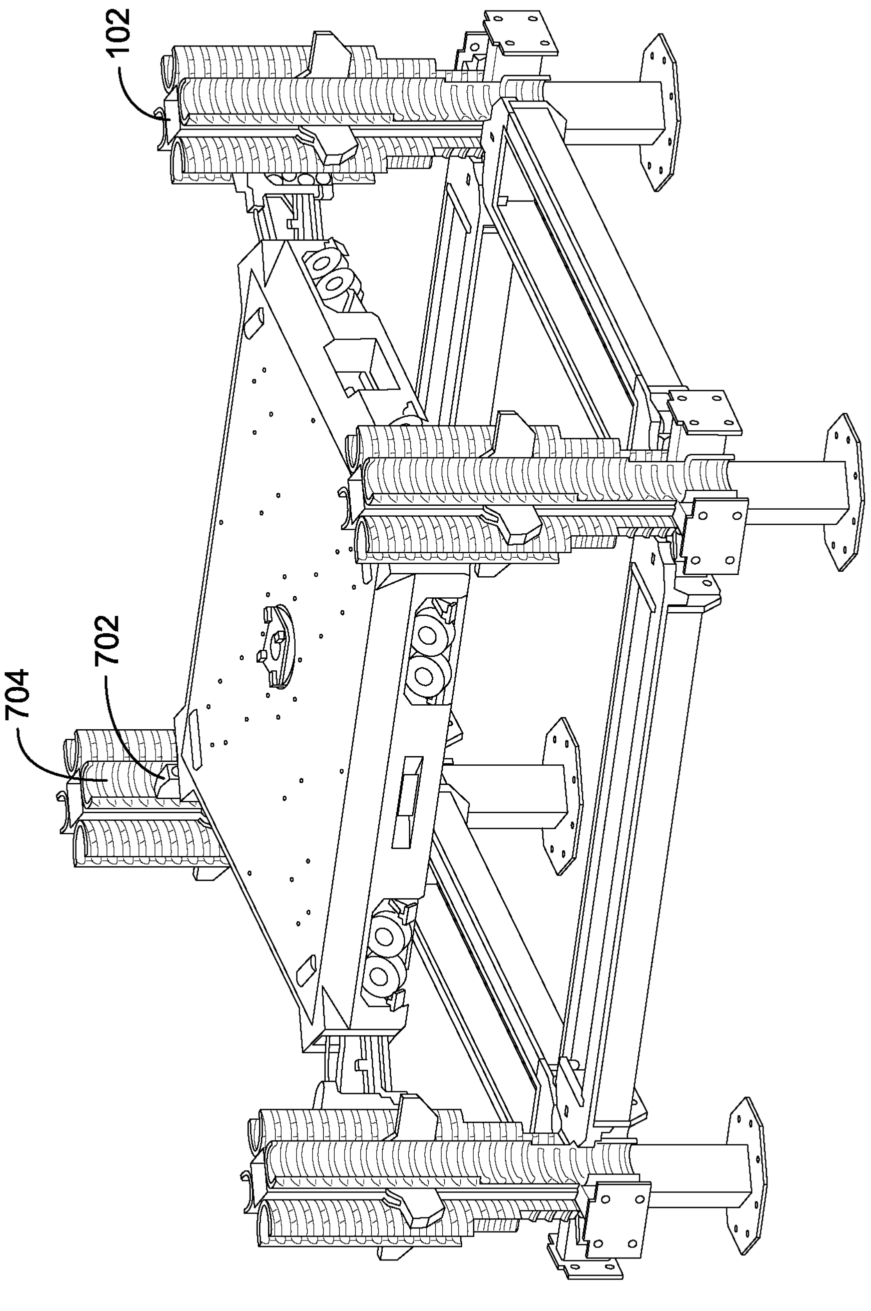

FIG. 7B illustrates an overall view of a robot with worm gears engaging in vertical rack gears on the structural columns of a cuboid cell, according to some embodiments. As can be seen from the figure, the helical rack gear 704 only captures a portion of the worm gear 702 geometry and has positive engagement pressure by the material handling robot to hold the worm gears 702 against the structural columns 102. Overall, there are total four worm gears for a material handling robot and four helical rack gears disposed at four different sides of each column, with only one helical rack gear from each of the columns engages in the worm gear extended from a respective corner of the material handling robot.

Figure 8A:
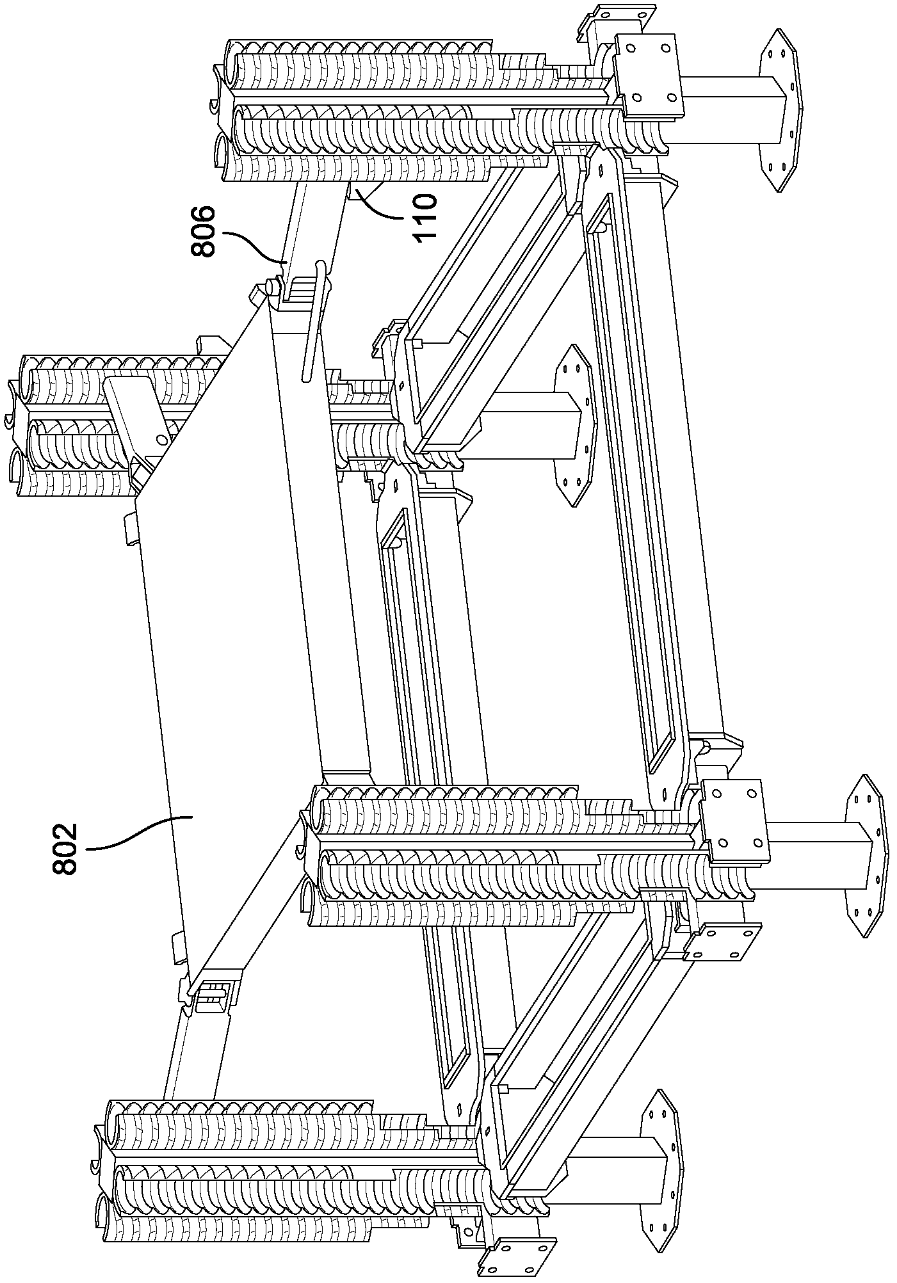
FIG. 8A illustrates an exemplary pallet support tray used to support goods stored in a cuboid cell, according to some embodiments.

Referring now to FIG. 8A, an exemplary pallet support tray used to support goods stored in a cuboid cell is further illustrated, according to some embodiments. The pallet support tray 802 may interface with four fixing members 110 disposed on the four structural columns of a cuboid cell to secure the pallet support tray for storage. This interfacing may be achieved by articulated arms 806 included in the pallet support tray 802. Four articulated arms 806 may be disposed at the four corners of the pallet support tray 802. A articulated arm 806 may extend or rotate out to mate with a fixing member 110 disposed on a structural column when securing the pallet support tray 802 in a cuboid cell for storage. When the pallet support tray 802 is not in the storage (e.g., movements before or after storage), actuated arms may be actuated in a retracted position, e.g., in a hiding place under or inside the pallet support tray 802, to provide clearance so as not to hinder or interfere with movement of the pallet support tray when being moved by the material handling robot.

The extension or rotation of the articulated arms 806 of the pallet support tray may be controlled by a motor or multi-motors (not shown) disposed under the pallet support tray 802. For example, each articulated arm 806 may be independently controlled by a tiny motor. Alternatively, a single motor may be located at the center of a pallet support tray 802 and simultaneously control all articulated arms 806, e.g., by controlling four linkage rods, each linked to an articulated arm to drag or push an articulated arm to extend or rotate.

In some embodiments, to simply the manufacturing process, a pallet support tray 802 may not include any motor. Instead, a material handling robot may include a central post disposed on top of the robot, while a pallet support tray 802 may include, at the bottom, a central hole matching the central post on top of the robot. The central hole of the pallet support tray 802 may be further connected to four linkage rods for driving the articulated arms 806. The material handling robot may use its own motor inside the robot to drive the central post and correspondingly the central hole to rotate, so as to control the linkage rods and consequently the articulated arms 806 to extend or retract. This then controls the mating of the pallet support tray 802 with the fixing members 110 of the structural columns with a cuboid cell. In some embodiments, four movable posts may be disposed on the material handling robot to directly interface with the articulated arms 806 of the pallet support tray 802 to extend or retract the arms, without necessarily passing through the matching central hole and the linkage rods described above.

The exact mechanism for mating the articulated arms with the fix members may also vary, depending on the specific configurations. Exemplary mating mechanisms may include but not limited to a snap-fit connection, a pin connection, a thumb locking, and so on.

In some embodiments, there may be more than one levels of trays in a single pallet support structure. In such configurations, each level of tray may include its respective articulated arms. Accordingly, the structural columns may also have multiple levels of fixing members associated with multiple levels of trays in a pallet support structure. In some embodiments, the tray(s) in the upper level(s) of a multilevel structure may not have its own articulated arms, and thus the structural columns may only have one set of fixing members even the pallet support tray have multiple levels.

Figure 8B:
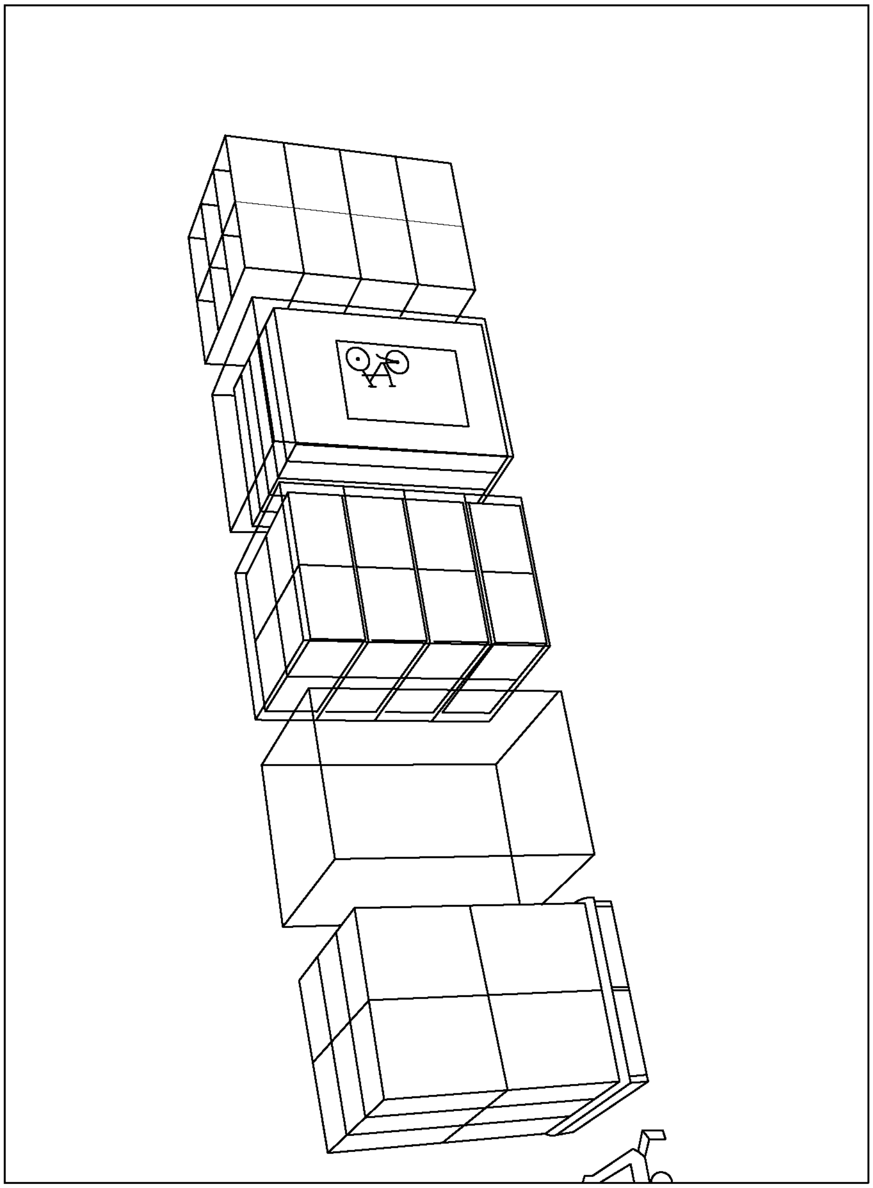
FIG. 8B illustrates various configurations of pallet support trays, according to some embodiments.

FIG. 8B illustrates various configurations of pallet support trays, according to some embodiments. The various configurations are mainly focused on the structures built upon a pallet support tray for holding the materials stored over the pallet support tray. As can be seen from FIG. 8B, these various configurations may include various levels and various sections in each level, but the overall size of these configurations are almost the same or close to each other.

These various configurations are designed to carry a variety of goods restricted within a rectangular cuboid volume sized to fit between structural columns and beams (and other components such as fixing members and first engagement structures) of cuboid cells, so that these goods will not be blocked by these structure components when being moved by a robot across different cells horizontally and vertically. Goods for storage include but are not limited to palletized goods, loose goods, goods on shelves, bins, or any other proper types of goods.

In some embodiments, the material handling robot disclosed here operates under computerized control. For example, the material handling robot disclosed herein may be communicated with through a centralized computer (e.g., a server), which may be configured to determine available pathways and one of the best pathways based on the ranking of each pathway. In one example, the centralized computer or server includes a specific application (e.g., 3D robot navigation application) configured to determine possible pathways for a material handling robot from any cell to any other cell.

For example, to determine possible pathways for moving a material handling robot from a first cuboid cell to a second cuboid cell, the application may start by checking each neighbor cell of the first cuboid cell and determine whether each neighbor cell contains a payload or not (i.e., free for passing or not). A neighbor cell can be any of the neighbor cells in a 3D environment. After identifying a neighbor cell that is available for passing through, a pathway may start to build. In one example, there may be six or less pathways to start with, depending on how many neighbor cells the first cuboid cell has and whether each neighbor cell is available to pass through. For each built pathway, the centralized computer or server may continue to extend and/or expand like a tree-node structure after checking the new neighbor cells of a neighbor cell of the first cuboid cell. The centralized computer or server may continue to extend and/or expand each possible pathway, until a pathway reaches the second cuboid cell to become an actual possible pathway for moving a payload from the first cuboid cell to the second cuboid cell. The centralized computer or server may eventually identify a plurality of likely pathways through the process, where each pathway may have different routes and corresponding lengths.

In some embodiments, the centralized computer or server may determine a most proper pathway out of many possible pathways for a material handling robot. For example, the centralized computer or server may determine time and energy required (for moving the payload by the material handling robot) for each pathway. A weighted score can be then determined for each pathway, where the weights for time and energy may be predefined and/or dynamically adjusted (e.g., time has a larger weight in the busy hours and a lower weight when it is not so busy). In some embodiments, additional factors such as safety or risk factors may be also considered in pathway ranking. For example, frequent vertical movements may cause certain goods shaking over a pallet support tray, and thus the weight for vertical movements may have a lower weight in pathway ranking. After determining the weighted score for each possible pathway, a top ranked pathway may be selected for the material handling robot to move a payload from the first cuboid cell to the second cuboid cell.

Figure 9B:
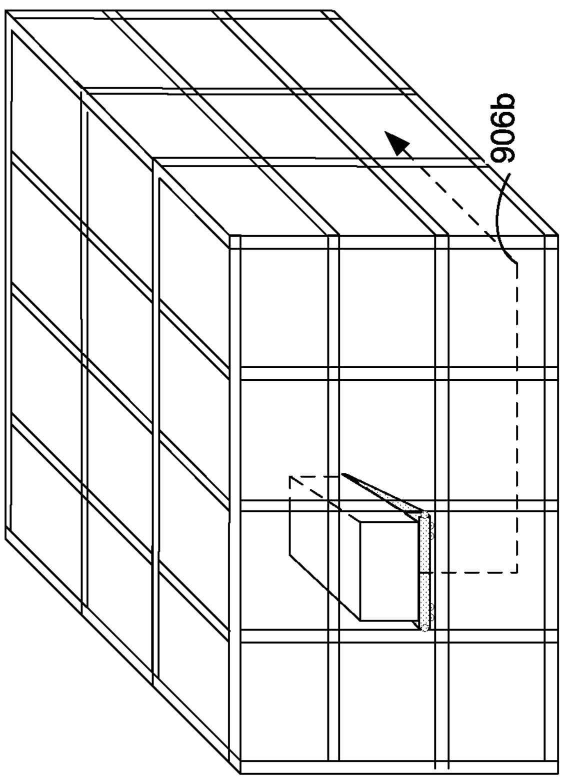
FIGS. 9A-9D illustrate different application scenarios for moving a robot through 3D cell-to-cell navigation, according to some embodiments.
Figure 9A:
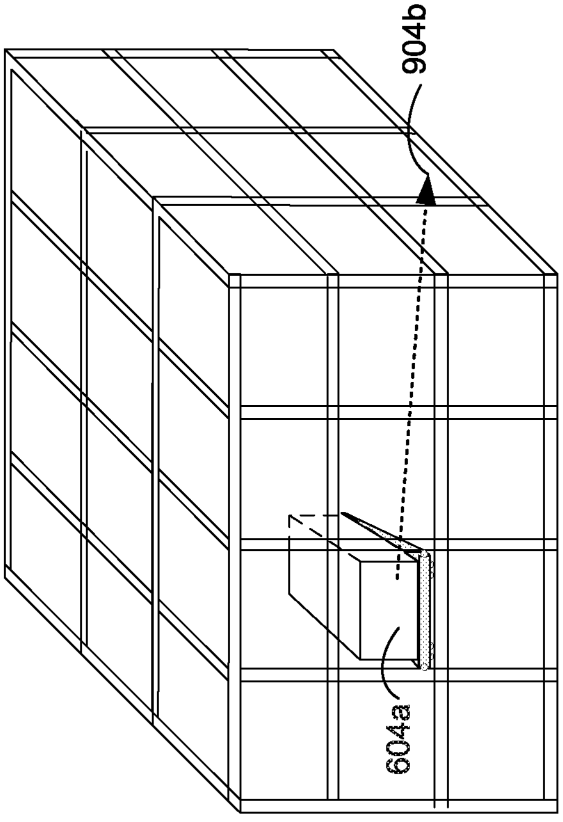
Figure 9D:
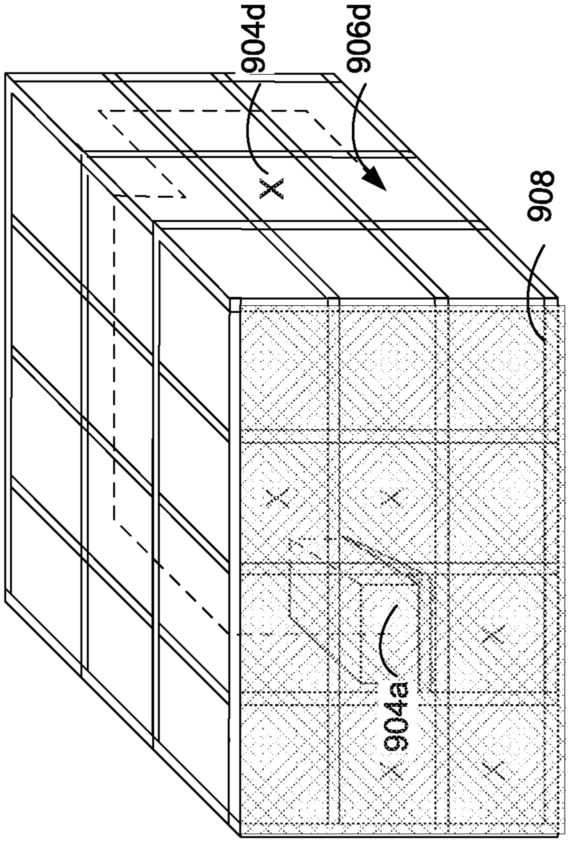

Referring now to FIGS. 9A-9D, different application scenarios for moving a material handling robot from any cell to any cell are further illustrated. Specifically, FIG. 9A illustrates an example scenario where a material handling robot tries to move a payload from cell 904*a* to 904*b*. For example, the cell 904*b* may be a cell reserved for general payload pickup by a crane for uploading to a transportation vehicle.

In one example application scenario, if there is no other payload within the illustrated storage facility, the material handling robot disclosed herein may choose one of the shortest pathways to move the payload from cell 904*a* to cell 904*b*. One example pathway (as indicated by a broken arrow 906*b*) is shown in FIG. 9B, which includes a first vertical cell-to-cell movement and then three horizontal cell-to-cell movements. It can be seen that there is no requirement of an external assistance (e.g., a lift structure such as a stacker crane) during the process.

Figure 9C:
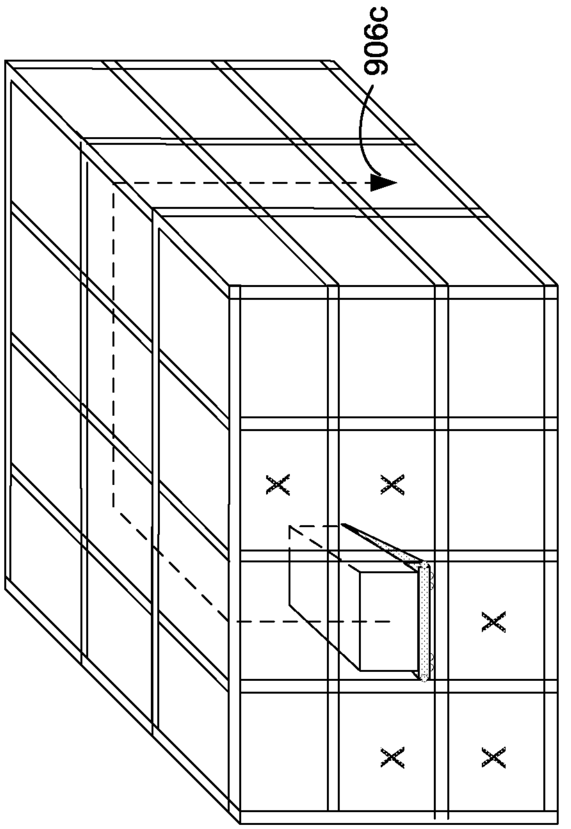

In another example application scenario, there is one cuboid cell occupied by a payload along the pathway 906*b*, as indicated by "x" in FIG. 9C. At this point, another different pathway 906*c* may be selected, as shown in FIG. 9C, which includes a first vertical movement, followed by three horizontal movements then by two vertical movements again. In yet another example application scenario, if an additional payload in the cell 904*d* blocks the pathway 906*c*, a new pathway 906*d* can be selected, which still allows the material handling robot to move from the cell 904*a* to 904*b*. It should be noted that in the above example application scenarios, the pathways 906*b*-906*d* are just example pathways. Some alternative pathways are also possible in each application scenario.

As can be seen from the above example scenarios, the 3D cell-to-cell navigation greatly increases the possible pathways to move a payload within a storage and retrieval system, among which, many pathways may be not possible for other existing automated storage and retrieval systems. For example, in FIG. 9D, if there is a wall 908 on the front side of the cell 904*a* and if there is another payload (not shown in FIG. 9D) stored on the backside of the cell 904*a*, then the payload in the cell 904*a* in the existing automated storage and retrieval systems cannot be moved, since there is no horizontal movement available for moving the payload in the cell 904*a*. In addition, since there is a wall 908, a crane is not able to reach the payload in the cell 904*a*, either. Accordingly, to move the payload in the cell 904*a*, one or more payloads in the neighbor cells (and/or some farther cells) need to moved away first, which then increases the time and resources to move away these payloads before moving the payload in the cell 904*a*.

Under certain circumstances, there are multiple material handling robots that operate in a same automated 3D storage and retrieval system, and there may be also multiple requests for moving items or goods simultaneously or within a short period of time. Accordingly, in some embodiments, the centralized computer or server is also configured to manage operations of multiple material handling robots (also referred to as "agents") within a storage and retrieval system. In one example, when determining the most proper pathways for each material handling robot, the centralized computer or server may consider possible collisions, and thus a selected pathway for each material handling robot may not necessarily always be the top ranked pathway among the all possible ways for a material handling robot.

In some embodiments, the centralized computer or server may further determine and/or adjust operation parameters such as moving speed, moving direction of each material handling robot at any moment within a storage and retrieval system. For example, to avoid likely collisions, when determining the most proper pathway for each material handling robot, the centralized computer or server may also take into consideration possible moving speed, including moving speed in each cell along a pathway to prevent possible collisions.

In another example, to avoid likely collisions, the centralized computer or server may define one or more restriction zones at a time point within the storage and retrieval system. A restriction zone is a zone defined by a set of points in which a single material handling robot is allowed at any given time. In other words, once a material handling robot has entered a restriction zone, no other bots are allowed in a respective zone. Any other material handling robot waiting to enter an occupied zone must wait in an area that does not block that material handling robot that is already in the occupied restriction zone. It should be noted that the above limitations do not apply to a payload at a station (e.g., a pick-up/drop-off/moving away/working (e.g., earmarking) station) in a restriction zone (presumably the payload would be at the end of a restriction zone), as a payload at a station can exist for an undetermined amount of time.

In some embodiments, the centralized computer or server may further determine proper locations (e.g., storage levels, inner or outer storage) for payloads within a storage and retrieval system. For example, to enable better management of item storage and/or retrieval, the centralized computer or server may further define different types of storage zones in a storage and retrieval system, such as a uniform high density zone, a uniform low density zone, and a non-uniform variable density zone. In a uniform high density zone, a higher density of stored items are stored therein. For example, for items that are purposed for long storage, since these items consume space and are not frequently accessed, these items can be stored in higher density (e.g., there are no or limited empty cells within the uniform high density zone). In general, the uniform high density zone is set to a higher storage level(s) and/or inner area(s) in a storage and retrieval system. On the contrary, for items that are purposed for short storage, these items can be stored in the uniform low density zone. By setting such a low density zone, it allows easier access to items or goods stored therein, since this zone is more frequently accessed than other zones. In general, the uniform low density zone can be set to a lower storage level(s) and/or outer area(s) in a storage and retrieval system. For a non-uniform variable density zone, it can be used for storage of items that have a large quantity but require frequent access, items that require access that is not so long or so short or access that is unpredictable. In some embodiments, each of the aforementioned zones are predefined, and thus when new items or goods are received, based on the expected storage length, it can be assigned to one of the predefined zones. In some embodiments, one or more predefined zones can be dynamically adjusted. For example, if most items or goods received recently are expected to be stored for a short period of time, then the predefined uniform low density zone can be enlarged, which means that the uniform high density zone and/or non-uniform variable density zone needs to be reduced. In some embodiments, there may be more than three types of zones. For example, based on the expected storage length, there may be four, five, six, seven, eight, or another number of zones that can be defined for a storage and retrieval system.

In some embodiments, the centralized computer or server may employ artificial intelligence (AI) engine in managing the pallet storage in a storage and retrieval system. For example, one or more machine learning models may be included in a 3D robot navigation application included in the centralized computer or server to predict a likely retrieval time of each item stored in the facility, the information of which can be used to further determine proper locations (e.g., a proper zone) for arrangement of incoming items or goods for storage. For another example, another one or more machine learning models may predict incoming storage/retrieval demands, and make proper adjustment (e.g., moving speeds of material handling robots) in view of likely higher storage/retrieval demands. Additional machine learning models may also predict likely failures of a material handling robot based on the operation parameters so that the material handling robot can be pulled out from operation for maintenance and/or repairment.

In some embodiments, one or more material handling robots may implement all or some of the above described functions implemented by the centralized computer or server. For example, a 3D robot navigation application may be installed in the centralized computer or server as well as one or more material handling robots to implement the above describes functions by either of the server or robots. The use of a robot-level application may allow for removal of a hard dependency on an external planning server and allow for autonomous system operation that enables higher uptime and throughput of the system.

Figure 10:
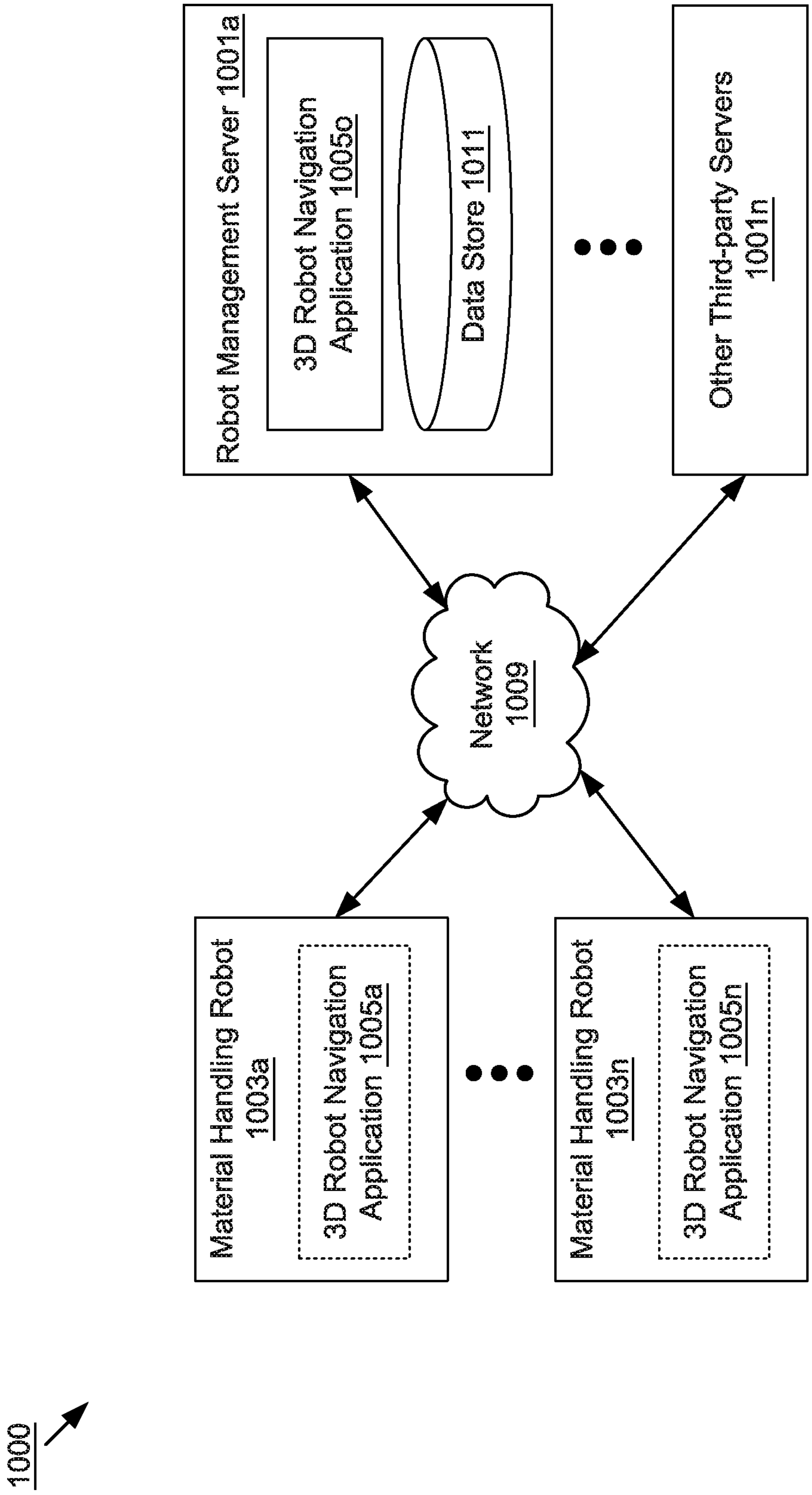
FIG. 10 illustrates an example system architecture for implementing a 3D robot navigation application, according to some embodiments.

FIG. 10 illustrates an example system architecture for the disclosed automated 3D storage and retrieval system 1000 for implementing a 3D robot navigation application, according to some embodiments. In the illustrated embodiment, the automated 3D storage and retrieval system 1000 may take the form of hardware and/or software components running on hardware. For example, in the automated 3D storage and retrieval system 1000, certain software (e.g., applications or apps, operational instructions, modules, etc.) may be run on a processing device, such as a computer, mobile device (e.g., material handling robot, moving vehicle, shuttle, or Internet of Thing (IoT) devices) and/or any other electronic device. In some embodiments, the components of the automated 3D storage and retrieval system 1000 may be distributed across and executable by multiple devices. For example, location information and/or operation information of a material handling robot may be locally collected (e.g., by one or more sensors) by the material handling robots, which may be transmitted to and processed by other devices (e.g. servers or other material handling robots) in a network.

As illustrated in FIG. 10, an automated 3D storage and retrieval system 1000 may include distributed material handling robots 1003*a*-1003*n* (collectively or individually referred to as material handling robot 1003), network 1009, and a server environment comprising one or more servers, including but not limited to robot management server 1001*a* and one or more third-party servers 1001*n*. One skilled in the art will appreciate that the scale of the automated 3D storage and retrieval system 1000 may vary and may include additional or fewer components than those illustrated in FIG. 10. In some embodiments, interfacing between components of the automated 3D storage and retrieval system 1000 may occur remotely, for example, where the components of the automated 3D storage and retrieval system 1000 may be distributed across one or more devices of a distributed network.

Material handling robot 1003 may be configured to collect and transmit certain operation information of the material handling robot. For example, a material handling robot may include or may be coupled to one or more sensors configured to collect location information and operation parameters such as speeds, moving directions and so on, which can be then transmitted to the robot management server 1001*a*.

As illustrated in FIG. 10, in some embodiments, a material handling robot 1003 may optionally include a respective 3D robot navigation application 1005*a* or 1005*n*. The robot management server 1001*a* may include a data store 1011 for storing robot data and stored items data, as well as an instance of 3D robot navigation application 1005*o* (1005*a* . . . 1005*o* together or individually referred to as 3D robot navigation application 1005). The data store 1011 and/or the 3D robot navigation application 1005*o* may reside on a single server or may be spread across multiple servers, as desired or practical. The robot management server 1001*a* may be implemented according to executable code and/or associated server components used to support computing on the server 1001*a*. The data store 1011 may include one or more non-transitory computer-readable media, and may collectively comprise logical data, executable code, instructions, and/or associated components to support storage, data management, and retrieval of the calendar and/or user data. The material handling robot data may comprise planned pathways for each material handling robot, incoming tasks for each material handling robot, current locations or operating parameters, etc. The stored items data may include location information, expected storage time, specific item information for the stored items, etc.

Robot management server 1001*a* may be a cloud server that possesses larger computing/communication capabilities and computing resources than a material handling robot 1003, and therefore may perform more complex computations or communications than the material handling robot 1003 can. For example, a complicated decision process for determining pathways for each material handling robot and assignment of incoming tasks for each material handling robot may be determined by the robot management server 1001*a*, while a determination to slow down in view of a possible collision based on the collected sensor data may be implemented in the instance of the 3D robot navigation application 1005*a* or 1005*n* on a material handling robot 1003.

In some embodiments, the robot management server 1001*a* may be further configured to facilitate communication between the material handling robots 1003, and possibly other third-party servers (s) 1001*n*. For example, material handling robots 1003 may exchange location and/or operation information via the robot management server 1001*a* over the network 1009, directly between material handling robots 1003 via the network 1009, and/or through direct device-to-device information exchange, such as over a local pairing or network connection (e.g., Bluetooth, near-field communication, infrared, etc.).

Other third-party servers 1001*n* may be provided using other logical server instances or included with the robot management server 1001*a* according to some embodiments. The third-party servers 1001*n* may provide additional services to the robot management server 1001*a*, or the services may be provided directly to the material handling robots 1003. Third-party server features and services may be related to item storage and retrieval. Examples of third-party server services may include, but are not limited to, certain ordering services and shipping information and the like related to items stored in a storage and retrieval system.

Network 1009 may be a conventional type, wired and/or wireless, and may have numerous different configurations, including a star configuration, token ring configuration, mesh configuration, or other configurations. For instance, the network 1009 may include one or more local area networks (LAN), wide area networks (WAN) (e.g., the Internet), public networks, private networks, virtual networks, mesh networks, peer-to-peer networks, and/or other interconnected data paths across which multiple devices may communicate. The network 1009 may also be coupled to or include portions of a telecommunications network for sending data in a variety of different communication protocols. In some embodiments, the network 1009 includes Bluetooth communication networks or a cellular communications network for sending and receiving data including via short messaging service (SMS), multimedia messaging service (MMS), hypertext transfer protocol (HTTP), message queuing telemetry transport (MATT), direct data connection, wireless application protocol (WAP), email, etc. In some embodiments, during data transmission, certain security mechanisms may be implemented in the network 1009, to ensure no user information is leaked during data transmission between the material handling robots 1003 and/or the robot management server 1001*a* and/or the third-party servers 1001*n*.

TERMINOLOGY

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

With respect to a roller worm as described herein, a "screw" gear often refers to translation of motion (e.g. lead screw) and a "worm" gear traditionally includes an involute-curve tooth profile. Based on a "roller screw" existing as a separate, pre-existing device, a roller worm may be the next most appropriate nomenclature as to not confuse with the existing roller screw.

What is claimed is:

1. An automated storage and retrieval system, comprising:
- a multi-level storage rack comprising a plurality of cuboid cells comprising a 3D grid of cuboid cells defining at least:
  - a horizontal traversal path linking a set of laterally-adjacent cells within the 3D grid of cuboid cells,
  - a vertical traversal path linking a set of vertically-adjacent cells within the 3D grid of cuboid cells, wherein the vertical traversal path extends through a first set of cells above the horizontal traversal path and through a second set of cells below the horizontal traversal path; and
- a material handling robot configured to navigate along the vertical traversal path and along the horizontal traversal path from a first cuboid cell to a second cuboid cell of the multi-level storage rack, wherein,
- when the navigation from the first cuboid cell to the second cuboid cell is along a vertical direction, the material handling robot is driven to move along structural columns of the first cuboid cell.

2. The automated storage and retrieval system of claim 1, wherein a cuboid cell, of the plurality of cuboid cells, comprises a number of structural columns and a number of beam assemblies connecting bottom portions of the structural columns to form a cuboid structure.

3. The automated storage and retrieval system of claim 2, wherein a structural column comprises a first engagement structure for setting up engagement with a second engagement structure disposed on the material handling robot for facilitating a vertical navigation of the material handling robot from the first cuboid cell to the second cuboid cell.

4. The automated storage and retrieval system of claim 3, wherein the first engagement structure is a chain aligned along the structural column, and the second engagement structure is a sprocket gear disposed at a corner of the material handling robot.

5. The automated storage and retrieval system of claim 3, wherein the first engagement structure is a plurality of perforations aligned along the structural column, and the second engagement structure is a sprocket gear disposed at a corner of the material handling robot.

6. The automated storage and retrieval system of claim 3, wherein the first engagement structure is a vertical, static helical rack aligned along the structural column, and the second engagement structure is a worm gear disposed at a corner of the material handling robot.

7. The automated storage and retrieval system of claim 3, wherein the structural column comprises a number of first engagement structures each aligned along different sides of the structural column, and the material handling robot comprises a number of second engagement structures each disposed at a different corner of the material handling robot.

8. The automated storage and retrieval system of claim 3, wherein the structural column further comprises a fixing member disposed at a predefined distance from a beam assembly of the number of beam assemblies, the beam assembly in a direction parallel to the structural column, the fixing member being configured to secure a payload in the cuboid cell.

9. The automated storage and retrieval system of claim 8, wherein the predefined distance is greater than an overall height of the material handling robot in a first state and smaller than an overall height of the material handling robot in a second state.

10. The automated storage and retrieval system of claim 9, wherein the first state of the material handling robot is a state when the material handling robot does not carry a payload or a state when the material handling robot carries a payload but is not in action to secure the payload to or release the payload from the fixing member.

11. The automated storage and retrieval system of claim 9, wherein the second state of the material handling robot is a state when the material handling robot is in an action to secure the payload to or release the payload from the fixing member.

12. The automated storage and retrieval system of claim 2, wherein a beam assembly comprises one or more structural beams and a rail built into a structural beam of the one or more structural beams.

13. The automated storage and retrieval system of claim 12, wherein, when the navigation from the first cuboid cell to the second cuboid cell is along the horizontal traversal path, the material handling robot is configured to navigate along rails built into structural beams of the first cuboid cell.

14. The automated storage and retrieval system of claim 12, wherein the material handling robot comprises a number of first wheel sets that are actuated to an engaged position and a number of second wheel sets that are actuated to a disengaged position when the navigation from the first cuboid cell to the second cuboid cell is along the horizontal direction.

15. A multi-level storage rack, comprising:
- a plurality of cuboid cells arranged in a three-dimensional array, wherein a cuboid cell comprises:
  - a number of vertically aligned structural columns comprising a first structural column and a second structural column directly below the first structural column, wherein the first structural column and second structural column define a vertical traversal path; and
  - a number of horizontally aligned beam assemblies comprising a beam assembly, the number of horizontally aligned beam assemblies connecting bottom portions of the structural columns to form a cuboid structure, wherein:
  - the first structural column further comprises a first engagement structure, disposed along the first structural column for engaging with a second engagement structure of the material handling robot to allow the material handling robot to move vertically;
  - the beam assembly comprises one or more beams with a rail built into a beam included in the beam assembly, wherein the rail defines a horizontal traversal path, to allow the material handling robot to move horizontally, wherein the rail extends through an intermediate portion of the vertical traversal path.

16. The multi-level storage rack of claim 15, wherein the first structural column further comprises a fixing member for securing a payload for storing in the cuboid cell.

17. A material handling robot, comprising:
- a payload holding unit comprising a top surface, a bottom surface, and a number of side surfaces;

a number of wheel sets, a wheel set being disposed along one of the side surfaces and actuated to be in an engaged position or a disengaged position; and a set of second engagement structures, disposed at corners of the payload holding unit, for securing a payload through engaging with a set of first engagement structures disposed along structural columns included in a cuboid cell within the multi-level storage rack, wherein each of the set of second engagement structures is disposed on a respective arm extending outwardly from a respective corner of the material handling robot.

18. The automated storage and retrieval system of claim 6, wherein the cuboid cell comprises four structural columns, wherein each structural column of the four structural column comprises a respective vertical, static helical rack aligned along the respective structural column.

19. The automated storage and retrieval system of claim 1, wherein the 3D grid of cuboid cells further defines a second horizontal traversal path through the first set of cells and a third horizontal traversal path through the second set of cells.

* * * * *